United States Patent
Sweeney et al.

(10) Patent No.: US 11,448,140 B2
(45) Date of Patent: Sep. 20, 2022

(54) TESTABLE PNEUMATIC CONTROL ASSEMBLIES AND RELATED SYSTEMS AND METHODS

(71) Applicant: Emerson Process Management Power and Water Solutions, Inc., Pittsburgh, PA (US)

(72) Inventors: Thomas Sweeney, Sarver, PA (US); Ryan Michael Purtell, Pittsburgh, PA (US); Kolin Hundertmark, Gibsonia, PA (US); Michael Henry Winwood, Gibsonia, PA (US); Samuel David Onuska, Pittsburgh, PA (US); Michael David Scandrol, South Park, PA (US)

(73) Assignee: Emerson Process Management Power and Water Solutions, Inc., Pittsburgh, PA (US)

( * ) Notice: Subject to any disclaimer, the term of this patent is extended or adjusted under 35 U.S.C. 154(b) by 345 days.

(21) Appl. No.: 16/831,279

(22) Filed: Mar. 26, 2020

(65) Prior Publication Data
US 2021/0301733 A1 Sep. 30, 2021

(51) Int. Cl.
*F02C 9/28* (2006.01)
(52) U.S. Cl.
CPC ..................... *F02C 9/28* (2013.01)
(58) Field of Classification Search
CPC .......... F02C 9/28; F16K 31/06; F15B 13/043; F15B 13/0431
See application file for complete search history.

(56) References Cited

U.S. PATENT DOCUMENTS

| | | | |
|---|---|---|---|
| 9,528,534 B2 * | 12/2016 | Finke | F15B 15/20 |
| 9,896,962 B2 * | 2/2018 | Wojick | F01D 21/18 |
| 9,903,221 B2 * | 2/2018 | Jacobs | F01D 21/18 |
| 10,018,072 B2 * | 7/2018 | Virkler | F16K 31/043 |
| 2006/0230755 A1 | 10/2006 | Natili, Jr. et al. | |
| 2015/0291143 A1 * | 10/2015 | Jeon | F16K 15/00 137/601.2 |
| 2020/0223414 A1 * | 7/2020 | Brutt | B60T 7/20 |

* cited by examiner

*Primary Examiner* — Ehud Gartenberg
*Assistant Examiner* — Henry Ng
(74) *Attorney, Agent, or Firm* — Hanley, Flight & Zimmerman, LLC

(57) ABSTRACT

Testable, redundant pneumatic control assemblies and related systems and methods are described herein. An example pneumatic control assembly described herein includes first, second, and third parallel supply channels between a compressed air supply and valve header, first, second, and third parallel vent channels between a vent and the valve header, and first, second, third, fourth, fifth, and sixth logic valves. The first and sixth logic valves are disposed in the first parallel supply channel and the first parallel vent channel, the second and third logic valves are disposed in the second parallel supply channel and second parallel vent channel, and the fourth and fifth logic valves are disposed in the third parallel supply channel and third parallel vent channel. The pneumatic control assembly also includes a first, second, and third solenoid valves to control certain ones of the logic valves.

19 Claims, 10 Drawing Sheets

TESTABLE PNEUMATIC CONTROL ASSEMBLIES AND RELATED SYSTEMS AND METHODS

FIELD OF THE DISCLOSURE

This disclosure relates generally to pneumatic controls and, more particularly, to testable pneumatic control assemblies and related systems and methods.

BACKGROUND

Combustion turbines, such as those used for industrial power generation, involve the combustion of air and fuel in a combustion stage. Fuel is often supplied continuously through dedicated fuel lines to the combustion stage to maintain combustion and drive the combustion turbine. Process control systems associated with the combustion turbine may monitor and/or control the fuel supplied to the combustion stage during operation of the combustion turbine.

SUMMARY

A pneumatic control assembly disclosed here includes first, second, and third parallel supply channels between a compressed air supply and a valve header, first, second, and third parallel vent channels between a vent and the valve header, and first, second, third, fourth, fifth, and sixth logic valves. The first and sixth logic valves are disposed in the first parallel supply channel and the first parallel vent channel, the second and third logic valves are disposed in the second parallel supply channel and the second parallel vent channel, and the fourth and fifth logic valves are disposed in the third parallel supply channel and the third parallel vent channel. The pneumatic control assembly also includes a first solenoid valve to control the first and second logic valves, a second solenoid valve to control the third and fourth logic valves, and a third solenoid valve to control the fifth and sixth logic valves.

A system disclosed herein includes a pneumatically actuated valve, a compressed air supply, a vent, and a pneumatic control assembly. The pneumatic control assembly includes first, second, and third parallel supply channels between the pneumatically actuated valve and the compressed air supply, first, second, and third parallel vent channels between the pneumatically actuated valve and the vent, and first, second, third, fourth, fifth, and sixth logic valves. The first and sixth logic valves are disposed in the first parallel supply channel and the first parallel vent channel, the second and third logic valves are disposed in the second parallel supply channel and the second parallel vent channel, and the fourth and fifth logic valves are disposed in the third parallel supply channel and the third parallel vent channel. The first, second, third, fourth, fifth, and sixth logic valves are to control the flow of compressed air between the pneumatically actuated valve, the compressed air supply, and the vent.

Disclosed herein is a non-transitory computer readable storage medium including computer readable instructions that, when executed, cause at least one processor to at least energize first, second, and third solenoid valves of a pneumatic control assembly, and de-energize the first solenoid valve while the second and third solenoid valves are energized. While the second and third solenoid valves are energized, a supply channel is formed between a compressed air supply and a valve header. The instructions further cause the at least one processor to determine, after the first solenoid valve is de-energized, whether the first solenoid valve moved from a first position to a second position.

BRIEF DESCRIPTION OF THE DRAWINGS

In general, the same reference numbers will be used throughout the drawing(s) and accompanying written description to refer to the same or like parts.

Figure 1:
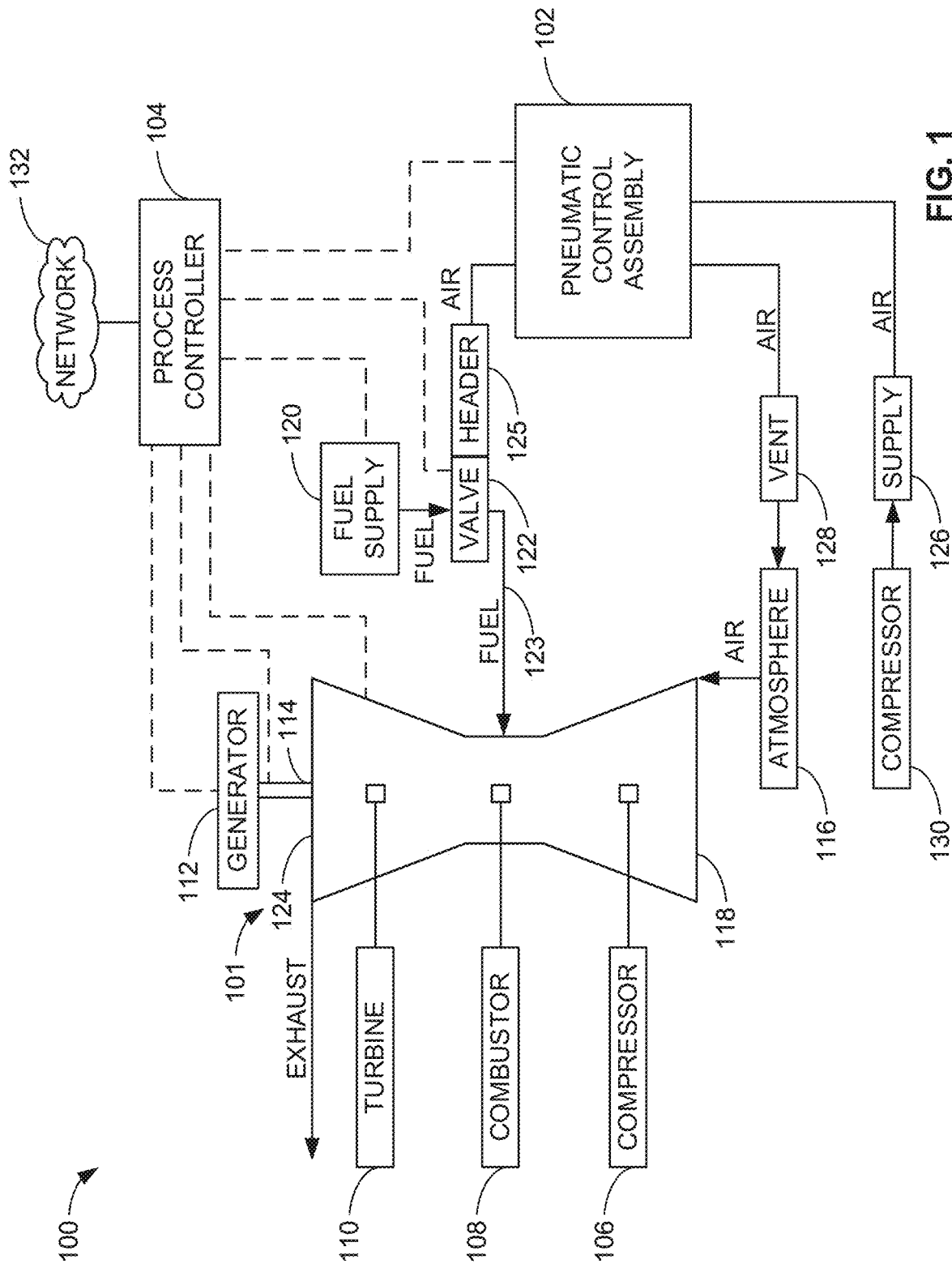
FIG. 1 is a schematic of an example system including an example combustion turbine and associated process control components including an example pneumatic control assembly and an example process controller constructed in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Combustion turbines are used in power generation applications to generate electricity from fuel such as natural gas, petroleum derivatives, and/or other combustible liquids. Combustion turbines are useful for meeting peak load electricity grid demands. This is because combustion turbines demonstrate ease in on-demand scalability of electricity generation and relatively short startup (e.g., run-up) and shutdown (e.g., run-down) times compared to base load means of power generation such as steam turbines, nuclear reactors, etc.

In general, combustion turbines have multiple stages. At a first stage of a combustion turbine, a compressor of the combustion turbine draws a working fluid, such as air, into the turbine body from atmospheric pressure and compresses the air into a combustor (e.g., a pressurized chamber internal to the turbine). At a second stage, fuel injectors provide a supply fuel (e.g., a constant supply of fuel) to the combustor and ignitors ignite the compressed air and fuel to combust the fuel/air mixture. At a third stage, the heated exhaust generated from this combustion in the combustor is forced through a turbine (e.g., an impulse turbine), which drives a rotor of the turbine and consequentially a shaft in a force-transmitting connection with the rotor. The rotation of the shaft drives a generator to produce electricity. The rotor is also in a force-transmitting connection with a rotor of the compressor such that the rotation of the turbine rotor causes the compressor to compress more air into the combustor.

In some instances, a combustion turbine may need to be shut down quickly (often referred to as being tripped) to avoid failure of components of the combustion turbine. A common way to shut down a combustion turbine is to shut off the fuel supply to the combustor. A process control system may monitor for one or more trip conditions and, if detected, may shut down the combustion turbine by shutting off the fuel supply. Examples of trip conditions include a sudden loss of electric load on a generator coupled to a combustion turbine, the rotational velocity of a shaft of a combustion turbine exceeding a threshold rotational velocity (e.g., an overspeed condition), excess thermal stress and/or temperatures, and/or excess vibrations. In some examples, one or more the above conditions (e.g., loss of load, overspeed, excess heat and/or thermal stress, excess vibration, etc.), if left unmitigated, can cause the failure of one or more turbine components or even catastrophic failures of the combustion turbine. This can be costly and/or dangerous to equipment and plant operators and can lead to interruptions in power delivery. Additionally, unwarranted (e.g., false-alarm) trips of a combustion turbine can also lead to unnecessary interruptions in power delivery as well as unnecessary thermal stress (e.g., from rapid cooling of turbine rotors) in the combustion turbine.

Thus, it is desirable to establish reliable, redundant, and online testable means of tripping a combustion turbine. Moderating and/or cutting off the supply of fuel to the combustor of the combustion turbine is a reliable means of controlling combustion reactions within the combustion turbine. In some instances, a normally closed pneumatic trip valve (e.g., a fuel control valve) is disposed in a fuel line between fuel supply and the combustor of the combustion turbine. The normally closed pneumatic trip valve is held open (to allow fuel flow to the combustor) by compressed air supplied by a pneumatic line from a compressed air supply.

In known trip systems, a dump valve (e.g., a pneumatic dump valve, a quick exhaust valve, etc.), implemented through a single solenoid valve, is disposed in the pneumatic line between the compressed air supply and the pneumatic trip valve. The dump valve is operable between a closed position or state and an open position or state. In the closed position, the dump valve enables the compressed air to be supplied to the pneumatic trip valve, thereby holding the pneumatic trip valve in the open position. In the open position, the dump valve releases the compressed air in the pneumatic line to atmosphere, thereby enabling the pneumatic trip valve to be biased to its closed position to shut off fuel supply to the combustion turbine.

Known dump valves can be disadvantageous because a single dump valve creates a single point of failure in the actuation of the trip valve. For example, in the instance where the dump valve fails to the closed state or position, the dump valve cannot be activated to release the pressurized air to allow the pneumatic trip valve to close. In such an instance, the combustion turbine may continue to run, which perpetuates any of the undesirable conditions (e.g., loss of load, overspeed, excess heat and/or thermal stress, excess vibration, etc.) and may lead to failure of one or more turbine components. In the instance where the dump valve fails to the open state or position, the pneumatic line supplying the compressed air is continuously vented to atmosphere until the dump valve is closed and/or repaired. This trips the turbine (e.g., by dumping the compressed air supplied to the pneumatic trip valve) and removes the ability to bring the combustion turbine back online until the dump valve is closed and/or repaired, which can interrupt commercial power delivery. Further, since the open dump valve continuously dumps compressed air to atmosphere, this can have the undesirable effect of draining air from the compressed air supply, thereby causing a decrease in air pressure available for other systems and components. Further, testing of the dump valve requires a trip of the combustion turbine and/or bringing the combustion turbine offline. Likewise, direct actuation of a trip valve (e.g., a solenoid trip valve, a hydraulic trip valve, etc.) similarly has a single point of failure in the actuation of the trip valve.

Disclosed herein are example online testable pneumatic control assemblies (which may also be referred to as pneumatic dump assemblies) and related systems and methods that address at least some of the above drawbacks of known systems. The pneumatic control assemblies may be used to control a device, such as a trip valve for a combustion turbine, for example. While many of the example disclosed herein are described in connection with a trip valve for a combustion turbine, it is understood that the examples disclosed herein can be similarly implemented with other types of devices used in connection with combustion turbines and/or any other control application. The example pneumatic control assemblies disclosed herein include a configuration of valves that exhibit redundancy, such that even if one of the valves fails, the example pneumatic control assembly can continue to operate to supply compressed air to a trip valve or vent compressed air from a trip valve. This improves the ability of the pneumatic control assembly to control a trip valve (and, thus, a combustion turbine) even if a failure has occurred in the pneumatic control assembly. This also eliminates the need to take a combustion turbine offline to repair a defective valve.

An example pneumatic control assembly disclosed herein includes multiple (parallel) supply channels that can supply compressed air to a pneumatic trip valve and multiple (parallel) vent channels that can vent the compressed air from the trip valve. In some examples, two logic valves are arranged in series in each of the parallel supply and vent channels. In some examples, the logic valves are implemented by pneumatically actuated valves. The logic valves are controlled by solenoid valves. In particular, in some examples, each solenoid valve controls two logic valves. However, none of the solenoid valves controls both logic valves in a single parallel supply channel or parallel vent channel. Therefore, if an individual solenoid valve or its logic valves become defective (e.g., fails to the open position or closed position), the other two solenoid valves can be operated to provide compressed air to the trip valve or release the compressed air from the trip valve and, thus, continue to control the trip valve. In other words, example pneumatic control assemblies disclosed herein have two out of three solenoid valve logic determination (e.g., energizing any two of the three solenoid valves opens the trip valve and de-energizing any two of the three solenoid valves closes the trip valve). Thus, failure of one of the solenoid valves and/or its associated logic valves does not bring the combustion turbine offline.

Further, the example pneumatic control assemblies disclosed herein are online testable. In particular, the individual solenoid valves and the logic valves of a pneumatic control assembly can be tested (e.g., energized and de-energized) without tripping the combustion turbine. If a defective valve is detected, the valve(s) can be repaired or replaced. For instance, the compressed air supply can be shut off to repair the defective valve(s). Further, the capability for operation and/or actuation of the solenoid valves and/or the trip valve can be tested by de-energizing two solenoid valves and detecting if a turbine trip occurs.

While some example pneumatic control assemblies and related systems and methods disclosed herein are described in connection with power (e.g., electricity) production by a combustion turbine (e.g., pneumatic trip valve control assemblies controlling a trip valve), it is understood that any of the examples disclosed herein may also be applied to combustion turbines in other applications such as aerospace applications (e.g., jet engines, turboprop engines, etc.) and in other power production applications such as steam turbines, etc. Further, the examples disclosed herein can be applied to any other appropriate application where redundant and/or testable valve control is desired.

FIG. 1 is a schematic of an example system 100 including an example combustion turbine 101 and associated process control components including an example pneumatic control assembly 102 and an example process controller 104 constructed in accordance with the teachings of this disclosure. The example pneumatic control assembly 102 is implemented in connection with a trip valve (disclosed in further detail herein) and, therefore, may also be referred to as a trip valve pneumatic control assembly. In the illustrated example of FIG. 1, the combustion turbine 101 includes an example compressor 106 (e.g., a compressor stage, an axial compressor, a centrifugal compressor, etc.), an example combustor 108 (e.g., a combustor stage, a combustion chamber, etc.), and an example turbine 110 (e.g., a turbine stage). The compressor 106 and/or the turbine 110 may each include one or more discrete stages (e.g., a high pressure stage, an intermediate pressure stage, a low pressure stage). In this example, the combustion turbine 101 is operatively coupled to an example generator 112 (e.g., a synchronous alternating current electric generator) via an example shaft 114. In this example, the rotors of the compressor 106 and the turbine 110 are in a force-transmitting connection (e.g., a splined connection, a fixed connection, etc.) with the example shaft 114. As such, the combustion turbine 101 drives the shaft 114, which drives the generator 112 to generate electricity. The combustion turbine 101 may be used in connection with a thermodynamic cycle such as the Brayton cycle. Other components and configurations of the system 100 that may be implemented in connection with the combustion turbine 101 may be omitted from FIG. 1 such as a reheater portion, a recuperator portion, combined cycle configurations, etc.

In the illustrated example of FIG. 1, input air is drawn into an example combustion turbine inlet 118 (e.g., a compressor inlet). In this example, the input air is atmospheric air from the atmosphere 116. In other examples, air or fluid from other sources may be used. The input air is compressed through the compressor 106 into the combustor 108, where the compressed air mixes with fuel (e.g., natural gas, petroleum derivatives, etc.) from an example fuel supply 120 injected into the combustor 108 by fuel injectors. An example valve 122 (e.g., a pneumatic fuel control valve, an externally piloted control valve) is coupled to a fuel line 123 between the fuel supply 120 and the combustor 108. In this example, the valve 122 is a trip valve and is therefore referred to herein as the trip valve 122. The fuel line 123 of the system 100 is to supply fuel from the fuel supply 120 to the combustion turbine 101. The trip valve 122 is disposed in the fuel line 123 to control the flow of fuel to the combustion turbine 101. In the illustrated example of FIG. 1, after the fuel combusts with the compressed air in the combustor 108, the resultant heated and pressurized combustion gasses expand through the turbine 110 and are exhausted at an outlet 124. The turbine 110 drives the shaft 114 and, in turn, drives the compressor 106 and the generator 112.

In the illustrated example of FIG. 1, the trip valve 122 is operable between an open position or state and a closed position or state. In the open position, the trip valve 122 allows fuel to flow from the fuel supply 120 to the combustor 108. In the closed position, the trip valve 122 blocks or prevents fuel flow to the combustor 108, which starves the combustor 108 and causes the combustion turbine 101 to stop. In this example, the trip valve 122 is a normally closed pneumatic trip valve. As such, the trip valve 122 is biased to the closed position. The trip valve 122 is held in the open position by a supply of compressed or pressurized air in an example valve header 125. In this example, the valve header 125 is implemented in connection with the trip valve 122 and is therefore referred to herein as the trip valve header 125. If the supply of compressed air in the trip valve header 125 is released, the trip valve 122 closes. For example, the trip valve 122 may be outfitted with a biasing element such as a compression spring to bias the trip valve 122 to the closed position. In this example, the trip valve header 125 is a section of the trip valve pneumatic control assembly 102 having a common pneumatic pressure and fluidly coupled to the trip valve 122. In other examples, the trip valve header 125 may be eliminated and pneumatic pressure may be supplied directly to the trip valve 122. In some examples, the valve header 125 supplies compressed air to the valve 122.

In the illustrated example of FIG. 1, the pneumatic control assembly 102 is pneumatically coupled to the trip valve header 125 (and, thus, the trip valve 122) to control the supply and release of the compressed air to/from the trip valve header 125. In some examples, the pneumatic control assembly 102 is operable between a first actuation state and a second actuation state. In the first actuation state, the pneumatic control assembly 102 allows compressed air to flow from an example compressed air supply 126 to the trip valve header 125, thereby holding the trip valve 122 in the open position. In the second actuation state, the pneumatic control assembly 102 vents (dumps) air from the trip valve header 125 to atmosphere 116 via an example first vent 128 to allow the trip valve 122 to bias to the closed position. In the example of FIG. 1, the compressed air supply 126 is provided by an example dedicated compressor 130. Additionally or alternatively, the compressed air supply 126 may be provided by house air supply (commonly referred to as plant air), common compressors, and/or any other suitable means of providing compressed air to the pneumatic control assembly 102 and the trip valve 122.

In the example of FIG. 1, the process controller 104 is implemented by a hardware processor. However, the process controller 104 can be implemented by any other type of circuitry such as, for example, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). The process controller 104 may be located in a control room, for example. In the illustrated example, the process controller 104 is communicatively coupled to an example network 132. The example network 132 may be an internal network (e.g., a private network) and/or an external network (e.g., the Internet).

In some examples disclosed herein, the process controller 104 monitors for the presence of one or more trip conditions (e.g., via measurements from one or more sensors). For example, the process controller 104 may receive information from and/or control one or more components of the system 100, such the combustion turbine 101, the generator 112, the shaft 114, the fuel supply 120, the trip valve 122, the trip valve header 125, and/or the pneumatic control assembly 102. If the process controller 104 detects that a trip condition has occurred, the process controller 104 actuates the pneumatic control assembly 102 to vent compressed air from the trip valve header 125 to the atmosphere (e.g., the second actuation state), thereby enabling the trip valve 122 to close and shut off fuel flow to the combustor 108. Examples of trip conditions include a loss of load on the generator 112, excess rotational velocity (e.g., overspeed) of the shaft 114, excess (e.g., exceeding a predetermined threshold) magnitudes and/or differentials in temperatures and/or thermal stresses in the combustion turbine 101 (e.g., the combustor 108, the turbine 110, etc.), and/or excess vibrations in the combustion turbine 101. Additionally or alternatively, the process controller 104 can operate the pneumatic control assembly 102 to open or close the trip valve 122 based on one or more manual commands (e.g., from a control room, from the network 132, etc.).

In some examples, the process controller 104 can perform a test to ensure that valves of the pneumatic control assembly 102 are in proper working condition. For example, the process controller 104 can actuate (e.g., energize and/or de-energize) one or more solenoid valves of the pneumatic control assembly 102 to determine if the one or more of the solenoid valves is/are in working condition. The process controller 104 can monitor the trip valve 122 and solenoid valves contained in the pneumatic control assembly 102 to verify the valves are in the expected and/or desired position or state, as disclosed in further detail herein.

Figure 2:
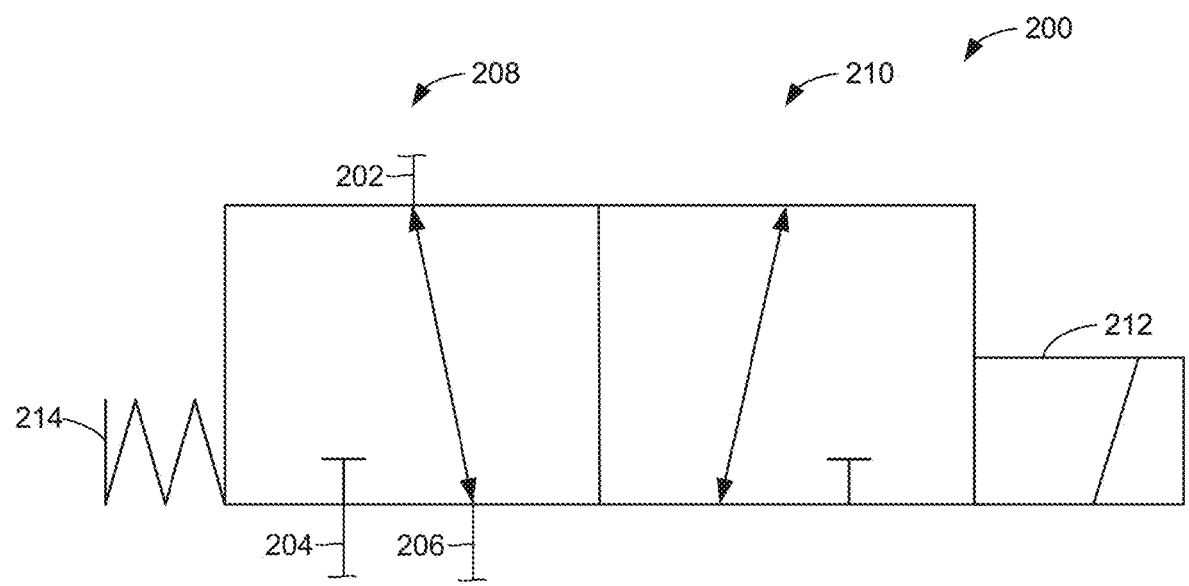
FIG. 2 is a schematic of an example electronically actuated solenoid valve that can be implemented in connection with the example pneumatic control assembly of FIG. 1.

FIG. 2 is a schematic of an example electronically actuated solenoid valve 200 that can be implemented in connection with the pneumatic control assembly 102 of FIG. 1. Example first, second, and third pneumatic lines or channels 202, 204, 206 are shown for illustrative purposes. The example solenoid valve 200 is operable between a first position 208 and a second position 210. When the solenoid valve 200 is in the first position 208, which is the position shown in FIG. 2, the solenoid valve 200 fluidly couples the first and third pneumatic channels 202, 206, and the second pneumatic channel 204 is closed or blocked. When the solenoid valve 200 is in the second position 210 (e.g., after being moved to the left in FIG. 2), the solenoid valve 200 fluidly couples the first and second pneumatic channels 202, 204, and the third pneumatic channel 206 is closed or blocked. In the illustrated example, the solenoid valve 200 includes a solenoid coil 212. When the solenoid coil 212 is energized, the solenoid valve 200 is moved to the left in FIG. 2 and operates in the second position 210. The solenoid valve 200 includes a biasing element to bias the solenoid valve 200 to the de-energized position 208. In this example, the solenoid valve 200 is biased to the first position 208 by an example spring 214. Therefore, when the solenoid coil 212 is de-energized, the solenoid valve 200 is moved back to the right in FIG. 2 to the first position 208. Thus, the first position 208 corresponds to the de-energized or de-actuated position, and the second position 210 corresponds to the energized or actuated position. Although the illustrated example of FIG. 2 depicts a schematic of example logic implemented by the solenoid valve 200, the schematic of FIG. 2 may not be representative of the physical structure of the solenoid valve 200. The solenoid valve 200 may be implemented as any type of valve, such as a direct acting valve, an indirect and/or internally piloted valve, etc. Further, any suitable biasing element other than the spring 214 may be utilized in connection with the solenoid valve 200. In some examples, the solenoid valve 200 is implemented as a single solenoid pilot, spring return solenoid valve with a flush, non-locking override. In some examples, the solenoid valve 200 is a 24 volt Direct Current (DC) or a 110-120 volt Alternating Current (AC) solenoid valve. An example of such a valve is the Emerson ASCO SPA 55 Series solenoid valve.

Figure 3:
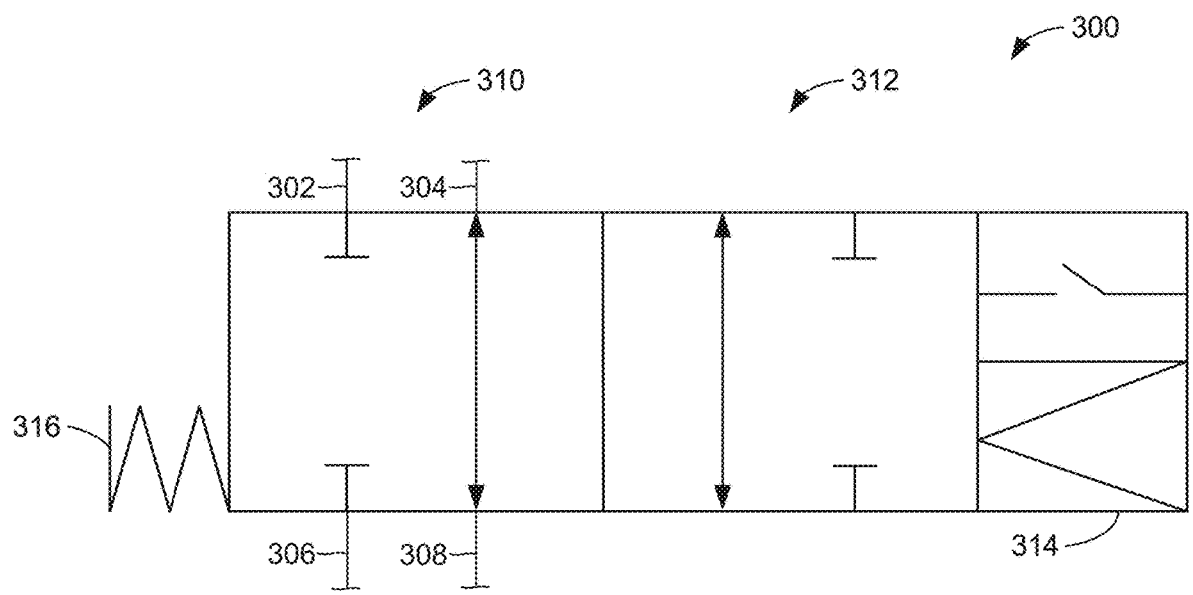
FIG. 3 is a schematic of an example logic valve that can be implemented in connection with the example pneumatic control assembly of FIG. 1.

FIG. 3 is a schematic of an example logic valve 300 that can be implemented in connection with the pneumatic control assembly 102 of FIG. 1. The logic valve 300 is used to connect various ports or channels depending on the state or position of the logic valve 300. Example first, second, third, and fourth pneumatic lines or channels 302, 304, 306, 308 are shown for illustrative purposes. The example logic valve 300 is operable between a first position 310 and a second position 312. When the logic valve 300 is in the first position 310, which is the position shown in FIG. 3, the logic valve 300 fluidly couples the second and fourth pneumatic channels 304, 308, and the first and third pneumatic channels 302, 306 are closed or blocked. When the logic valve 300 is in the second position 312 (e.g., after being moved to the left in FIG. 3), the logic valve 300 fluidly couples the first and third pneumatic channels 302, 306, and the second and fourth pneumatic channels 304, 308 are closed or blocked.

In this example, the logic valve 300 is implemented as a pneumatically piloted logic valve. The logic valve 300 includes a pilot 314. When a sufficient pressure is applied to the pilot 314 (e.g., via a pneumatic line or channel), the logic valve 300 is moved to the left in FIG. 3 and operates in the second position 312. In this example, the logic valve 300 is biased to the first position 310 by an example spring 316. Therefore, in this example, the logic valve 300 is piloted by compressed air (e.g., via the pilot 314) against the bias of the biasing element (e.g., the spring 316). When pilot 314 is de-energized (e.g., via reduction or loss of pressure), the logic valve 300 is moved to the right in FIG. 3 to the first position 310. Thus, the first position 310 corresponds to the de-energized or de-actuated position, and the second position 312 corresponds to the energized or actuated position.

Although the illustrated example of FIG. 3 depicts a schematic of example logic implemented by the logic valve 300, the schematic of FIG. 3 may not be representative of the physical structure of the logic valve 300. The logic valve 300 may be implemented as any type of valve, such as pneumatically actuated valve having a poppet or spool element controlled by a pilot device, a solenoid actuated valve, etc. Further, any suitable biasing element other than the spring 316 may be utilized in connection with the logic valve 300. In some examples, the logic valve 300 is implemented as a single air pilot valve with a return spring. An example of such a valve is the Emerson ASCO Numatics Series Mark 55 valve.

Figure 4:
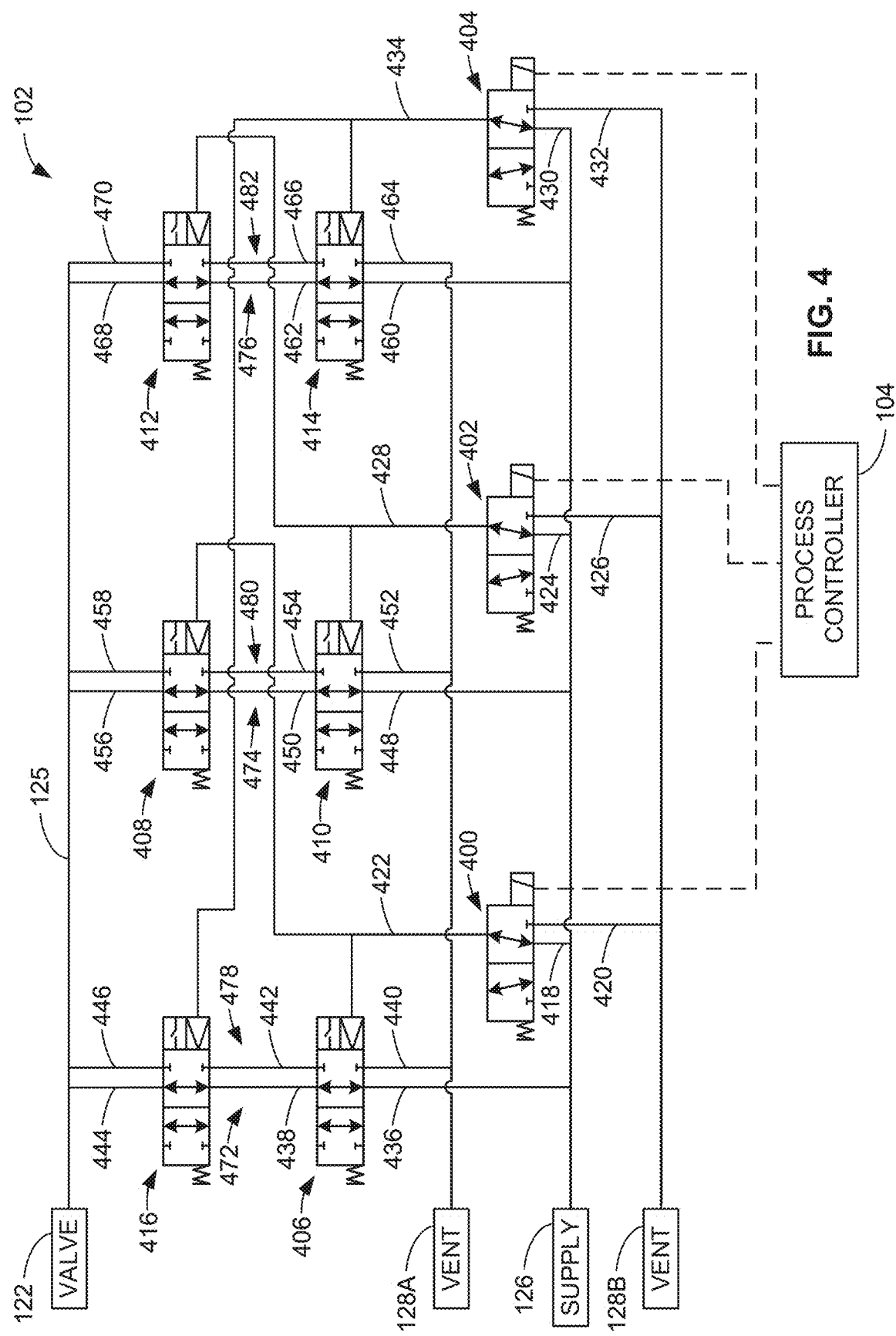
FIG. 4 is a schematic of the example pneumatic control assembly of FIG. 1 in a state in which three example solenoid valves are energized.

FIG. 4 is a schematic of the example pneumatic control assembly 102. Also shown in FIG. 4 is the example process controller 104 of FIG. 1 and the example trip valve 122. In the illustrated example of FIG. 4, an example first vent 128A and an example second vent 128B collectively implement the vent 128 of FIG. 1 (e.g., the vents 128A, 128B vent compressed air to the atmosphere 116 of FIG. 1).

In the illustrated example, the pneumatic control assembly 102 includes an arrangement of solenoid valves and logic valves. Each of the solenoid valves controls multiple logic valves. The logic valves are disposed in supply and vent channels to control the flow of compressed air to/from the trip valve header 125, thereby controlling whether the trip valve 122 is opened or closed. In the example of FIG. 4, the pneumatic control assembly 102 is in a state in which all of the solenoid valves are energized and all of the supply channels are open. As a result, compressed air is supplied from the compressed air supply 126 to the trip valve header 125 to hold the trip valve 122 in its open position.

In the illustrated example of FIG. 4, the pneumatic control assembly 102 includes a first example solenoid valve 400, a second example solenoid valve 402, and a third example solenoid valve 404. Each of the first, second, and third solenoid valves 400, 402, 404 is identical to the solenoid valve 200 of FIG. 2. In the illustrated example, the process controller 104 is electrically coupled to the first, second, and third solenoid valves 400, 402, 404 (e.g., to the solenoid coils 212 (FIG. 2)). The process controller 104 controls the first, second, and third solenoid valves 400, 402, 404. In particular, the process controller 104 can independently and selectively energize and/or de-energize each of the first, second, and third solenoid valves 400, 402, 404 (e.g., by applying an electrical current to a solenoid coil 212 (FIG. 2) or reducing or ceasing application of an electrical current to the solenoid coil 212). The broken line connections illustrate electrical connections between the process controller 104 and the first, second, and third solenoid valves 400, 402, 404.

In the illustrated example, the pneumatic control assembly 102 includes a first logic valve 406, a second logic valve 408, a third logic valve 410, a fourth logic valve 412, a fifth logic valve 414, and a sixth logic valve 416. Each of the logic valves 406-416 is identical to the logic valve 300 of FIG. 3. Certain ones of the logic valves 406-416 are controlled by certain ones of the solenoid valves 400-404, as disclosed in further detail herein. The solid line connections between the various valves indicate pneumatic (fluid) connections.

In the illustrated example of FIG. 4, the first solenoid valve 400 is operatively coupled to and controls the first logic valve 406 and the second logic valve 408. In particular, the first solenoid valve 400 is disposed between a first supply channel 418, a first vent channel 420, and a first pilot channel 422. The first supply channel 418 is fluidly coupled to the compressed air supply 126. The first vent channel 420 is fluidly coupled to the second vent 128B. The first pilot channel 422 is fluidly coupled to the pilots 314 (FIG. 3) of the first and second logic valves 406, 408. The first solenoid valve 400 is to control air flow from the compressed air supply 126 to the first pilot channel 422 fluidly coupled to the first and second logic valves 406, 408. In the illustrated example, the first solenoid valve 400 is in the second position 210 (FIG. 2). In the second position 210, the first solenoid valve 400 fluidly couples the first supply channel 418 and the first pilot channel 422. As a result, compressed air flows from the compressed air supply 126 through the first supply channel 418 and into the first pilot channel 422. The compressed air in the first pilot channel 422 holds the first and second logic valves 406, 408 in their second position 312 (FIG. 3) via pneumatic actuation of the respective pilots 314 (FIG. 3). Also, when the first solenoid valve 400 is in the second position 210, the first vent channel 420 is closed or blocked.

Similar to the first solenoid valve 400, the second solenoid valve 402 is operatively coupled to and controls two of the logic valves. In this example, the second solenoid valve 402 is operatively coupled to and controls the third logic valve 410 and the fourth logic valve 412. The second solenoid valve 402 is disposed between a second supply channel 424, a second vent channel 426, and a second pilot channel 428. The second supply channel 422 is fluidly coupled to the compressed air supply 126. The second vent channel 426 is fluidly coupled to the second vent 128B. The second pilot channel 428 is fluidly coupled to the pilots 314 (FIG. 3) of the third and fourth logic valves 410, 412. The second solenoid valve 402 is to control air flow from the compressed air supply 126 to the second pilot channel 428 fluidly coupled to the third and fourth logic valves 410, 412. In the illustrated example, the second solenoid valve 402 is in the second position 210 (FIG. 2). In the second position 210, the second solenoid valve 402 fluidly couples the second supply channel 424 and the second pilot channel 428. As a result, compressed air flows from the compressed air supply 126 through the second supply channel 424 and into the second pilot channel 428. The compressed air in the second pilot channel 428 holds the third and fourth logic valves 410, 412 in their second position 312 (FIG. 3) via pneumatic actuation of the respective pilots 314 (FIG. 3). Also, when the second solenoid valve 402 is in its second position 210, the second vent channel 426 is closed or blocked.

Similar to the first and second solenoid valves 400, 402, the third solenoid valve 404 is operatively coupled and controls two of the logic valves. In this example, the third solenoid valve 404 is operatively coupled to and controls the fifth logic valve 414 and the sixth logic valve 416. The third solenoid valve 404 is disposed between a third supply channel 430, a third vent channel 432, and third pilot channel 434. The third supply channel 430 is fluidly coupled to the compressed air supply 126. The third vent channel 432 is fluidly coupled to the second vent 128B. The third pilot channel 434 is fluidly coupled to the pilots 314 (FIG. 3) of the fifth and sixth logic valves 414, 416. The third solenoid valve 404 is to control air flow from the compressed air supply 126 to the third pilot channel 434 fluidly coupled to the fifth and sixth logic valves 414, 416. In the illustrated example, the third solenoid valve 404 is in the second position 210 (FIG. 2). In the second position 210, the third solenoid valve 404 fluidly couples the third supply channel 430 and the third pilot channel 434. As a result, compressed air flows from the compressed air supply 126 through the third supply channel 430 and into the third pilot channel 434. The compressed air in the third pilot channel 434 holds the fifth and sixth logic valves 414, 416 in their second position 312 (FIG. 3) via pneumatic actuation of the respective pilots 314 (FIG. 3). Also, when the third solenoid valve 404 is in its second position 210, the third vent channel 432 is closed or blocked. Thus, in this example, each of the solenoid valves 400-404 is actuated (in their second position 210 (FIG. 2)) and, thus, each of the logic valves 406, 408, 410, 412, 414, 416 is actuated (in their second position 312 (FIG. 3)).

In the illustrated example, the first logic valve 406 is disposed between a fourth supply channel 436, a fifth supply channel 438, a fourth vent channel 440, and a fifth vent channel 442. The fourth supply channel 436 is fluidly coupled to the compressed air supply 126. The fourth vent channel 440 is fluidly coupled to the first vent 128A. Further, the sixth logic valve 416 is disposed between the fifth supply channel 438, a sixth supply channel 444, the fifth vent channel 442, and a sixth vent channel 446. The sixth supply channel 444 and the sixth vent channel 446 are fluidly coupled to the trip valve header 125 leading to the trip valve 122. In this example, the first and sixth logic valves 406, 416 are in their second position 210 (FIG. 2). Therefore, the first logic valve 406 fluidly couples the fourth supply channel 436 and the fifth supply channel 438, and the sixth logic valve 416 fluidly couples the fifth supply channel 438 and the sixth supply channel 444. As a result, compressed air is permitted to flow from the compressed air supply 126 through the fourth supply channel 436, the fifth supply channel 438, and the sixth supply channel 444 to the trip valve header 125. This positive pressure in the trip valve header 125 holds the trip valve 122 in its open position, which allows fuel flow to the combustor 108 (FIG. 1). While the first and sixth logic valves 406, 416 are in their second position, as shown in FIG. 4, the first and sixth logic valves 406, 416 prevent or block fluid flow through the fourth, fifth, and sixth vent channels 440, 442, 446. Thus, compressed air in the trip valve header 125 is prevented from being vented to the first vent 128A through the fourth, fifth, and sixth vent channels 440, 442, 446.

In the example of FIG. 4, the third logic valve 410 is disposed between a seventh supply channel 448, an eighth supply channel 450, a seventh vent channel 452, and an eighth vent channel 454. The seventh supply channel 448 is fluidly coupled to the compressed air supply 126. The seventh vent channel 452 is fluidly coupled to the first vent 128A. Further, the second logic valve 408 is disposed between the eighth supply channel 450, a ninth supply channel 456, the eighth vent channel 454, and a ninth vent channel 458. The ninth supply channel 456 and the ninth vent channel 458 are fluidly coupled to the trip valve header 125 leading to the trip valve 122. In this example, the third and second logic valves 410, 408 are in their second position 210 (FIG. 2). Therefore, the third logic valve 410 fluidly couples the seventh supply channel 448 and the eighth supply channel 450, and the second logic valve 408 fluidly couples the eighth supply channel 450 and the ninth supply channel 456. As a result, compressed air is permitted to flow from the compressed air supply 126 through the seventh supply channel 448, the eighth supply channel 450, and the ninth supply channel 456 to the trip valve header 125. This positive pressure in the trip valve header 125 holds the trip valve 122 in its open position, which allows fuel flow to the combustor 108 (FIG. 1). While the second and third logic valves 408, 410 are in their second position 312, the second and third logic valves 408, 410 prevent or block fluid flow through the seventh, eighth, and ninth vent channels 452, 454, 458. Thus, compressed air in the trip valve header 125 is prevented from being vented to the first vent 128A through the seventh, eighth, and ninth vent channels 452, 454, 458.

In the example of FIG. 4, the fifth logic valve 414 is disposed between a tenth supply channel 460, an eleventh supply channel 462, a tenth vent channel 464, and an eleventh vent channel 466. The tenth supply channel 460 is fluidly coupled to the compressed air supply 126. The tenth vent channel 464 is fluidly coupled to the first vent 128A. Further, the fourth logic valve 412 is disposed between the eleventh supply channel 462, a twelfth supply channel 468, the eleventh vent channel 466, and a twelfth vent channel 470. The twelfth supply channel 468 and the twelfth vent channel 470 are fluidly coupled to the trip valve header 125 leading to the trip valve 122. In this example, the fourth and fifth logic valves 412, 414 are in their second position 210 (FIG. 2). Therefore, the fifth logic valve 414 fluidly couples the tenth supply channel 460 and the eleventh supply channel 462, and the fourth logic valve 412 fluidly couples the eleventh supply channel 462 and the twelfth supply channel 468. As a result, compressed air is permitted to flow from the compressed air supply 126 through the tenth supply channel 460, the eleventh supply channel 462, and the twelfth supply channel 468 to the trip valve header 125. This positive pressure in the trip valve header 125 holds the trip valve 122 in its open position, which allows fuel flow to the combustor 108 (FIG. 1). While the fourth and fifth logic valves 412, 414 are in their second positions, the fourth and fifth logic valves 412, 414 prevent or block fluid flow through the tenth, eleventh, and twelfth vent channels 464, 466, 470. Thus, compressed air in the trip valve header 125 is prevented from being vented to the first vent 128A through the tenth, eleventh, and twelfth vent channels 464, 466, 470.

In the illustrated example, the pneumatic control assembly 102 has three parallel supply channels between the trip valve header 125 and the compressed air supply 126. In particular, the pneumatic control assembly 102 has a first parallel supply channel 472, a second parallel supply channel 474, and a third parallel supply channel 476. The first parallel supply channel 472 is formed by the fourth, fifth, and sixth supply channels 436, 438, 444. The second parallel supply channel 474 is formed by the seventh, eighth, and ninth supply channels 448, 450, 456. The third parallel supply channel 476 is formed by the tenth, eleventh, and twelfth supply channels 460, 462, 468. The first, second, and third parallel supply channels 472, 474, 476 fluidly connect the trip valve header 125 and the compressed air supply 126.

Similarly, in the illustrated example, the pneumatic control assembly 102 has three parallel vent channels between the trip valve header 125 and the first vent 128A. In particular, the pneumatic control assembly 102 has a first parallel vent channel 478, a second parallel vent channel 480, and a third parallel vent channel 482. The first parallel vent channel 478 is formed by the fourth, fifth, and sixth vent channels 440, 442, 446. The second parallel vent channel 480 is formed by the seventh, eighth, and ninth vent channels 452, 454, 458. The third parallel vent channel 482 is formed by the tenth, eleventh, and twelfth vent channels 464, 466, 470. The first, second, and third parallel vent channels 478, 480, 482 fluidly connect the trip valve header 125 and the first vent 128A.

The first and sixth logic valves 406, 416 are disposed in the first parallel supply channel 472 and the first parallel vent channel 478 to regulate the flow of compressed air between the compressed air supply 126, the trip valve header 125, and the first vent 128A. The second and third logic valves 408, 410 are disposed in the second parallel supply channel 474 and the second parallel vent channel 480 to regulate the flow of compressed air between the compressed air supply 126, the trip valve header 125, and the first vent 128A. The fourth and fifth logic valves 412, 414 are disposed in the third parallel supply channel 476 and the third parallel vent channel 482 to regulate the flow of compressed air between the compressed air supply 126, the trip valve header 125, and the first vent 128A.

Figure 6:
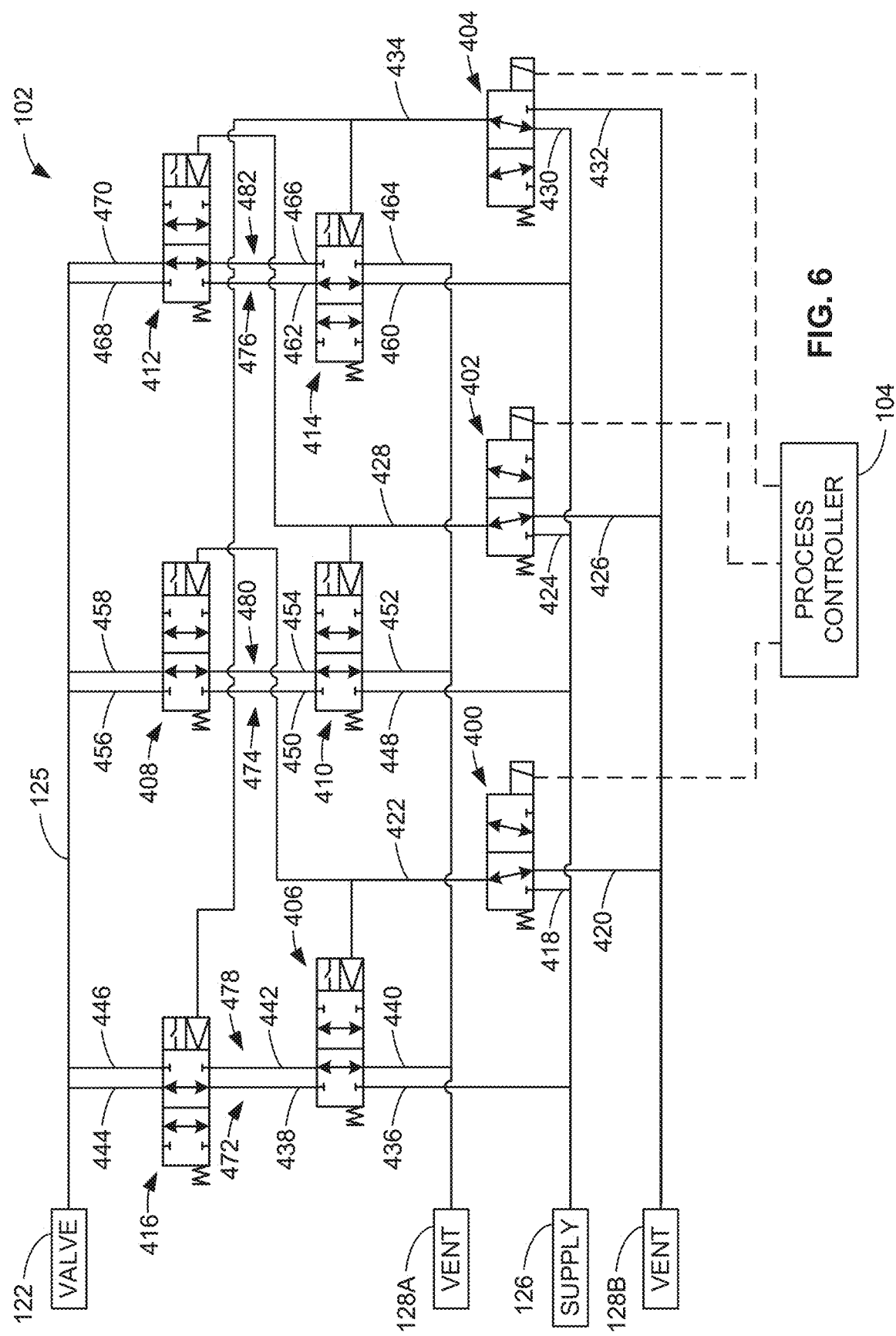
FIG. 6 is a schematic of the example pneumatic control assembly of FIG. 1 in a state in which one example solenoid valve is energized and two example solenoid valves are de-energized.
Figure 7:
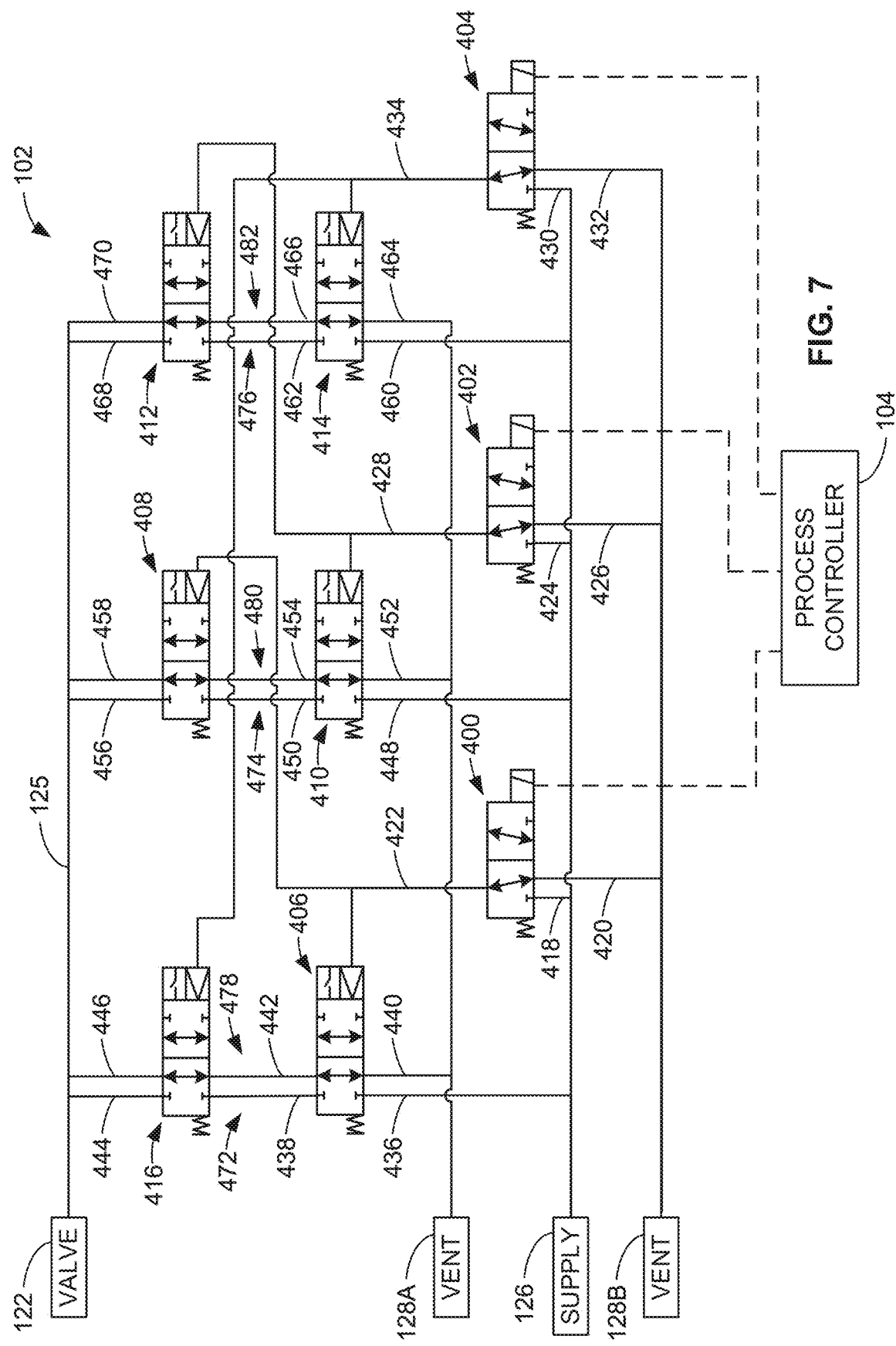
FIG. 7 is a schematic of the example pneumatic control assembly of FIG. 1 in a state in which three example solenoid valves are de-energized.

Therefore, in this example, the pneumatic control assembly 102 has three parallel supply channels, namely, the first, second, and third parallel supply channels 472, 474, 476. The first, second, and third parallel supply channels 472, 474, 476 are each operable to allow compressed air from the compressed air supply 126 to the trip valve header 125 and/or the trip valve 122. Thus, the first, second, and third parallel supply channels 472, 474, 476 are redundant relative to one another and together provide triple redundant supply channels. Likewise, the pneumatic control assembly 102 has three parallel vent channels, namely, the first, second, and third parallel vent channels 478, 480, 482. The first, second, and third parallel vent channels 478, 480, 482 are each operable to vent compressed air from the trip valve header 125 and/or the trip valve 122 to the first vent 128A. Thus, the first, second, and third parallel vent channels 478, 480, 482 are redundant relative to one another and together provide triple redundant vent channels. In the state illustrated in FIG. 4, the first, second, and third supply channels 472, 474, 476 are open and the first, second, and third vent channels 478, 480, 482 are closed. Thus, compressed air is supplied by the first, second and third supply channels 472, 474, 476 to the trip valve header 125. One or more of the solenoid valves 400-404 can be de-energized to switch the pneumatic control assembly 102 to another state, as shown in FIGS. 5-7 and described in further detail herein.

As can be seen in FIG. 4, each of the parallel supply channels and vent channels is controlled by two logic valves. However, no two logic valves in a single supply channel or vent channel are controlled by the same solenoid valve 400, 402, 404. In other words, each of the solenoid valves 400, 402, 404 only controls one logic valve in each of two of the parallel supply and vent channels. As such, any one of the parallel supply channels 472-476 or the parallel vent channels 478-482 can be opened by operating the two solenoid valves associated with the logic valves of that parallel supply/vent channel. As such, the failure or de-actuation of one of the solenoid valves 400-404 and/or the logic valves 406-416 does not result in the trip valve 122 moving to the closed position. An example of this situation is shown in further detail in connection with FIG. 5.

Figure 5:
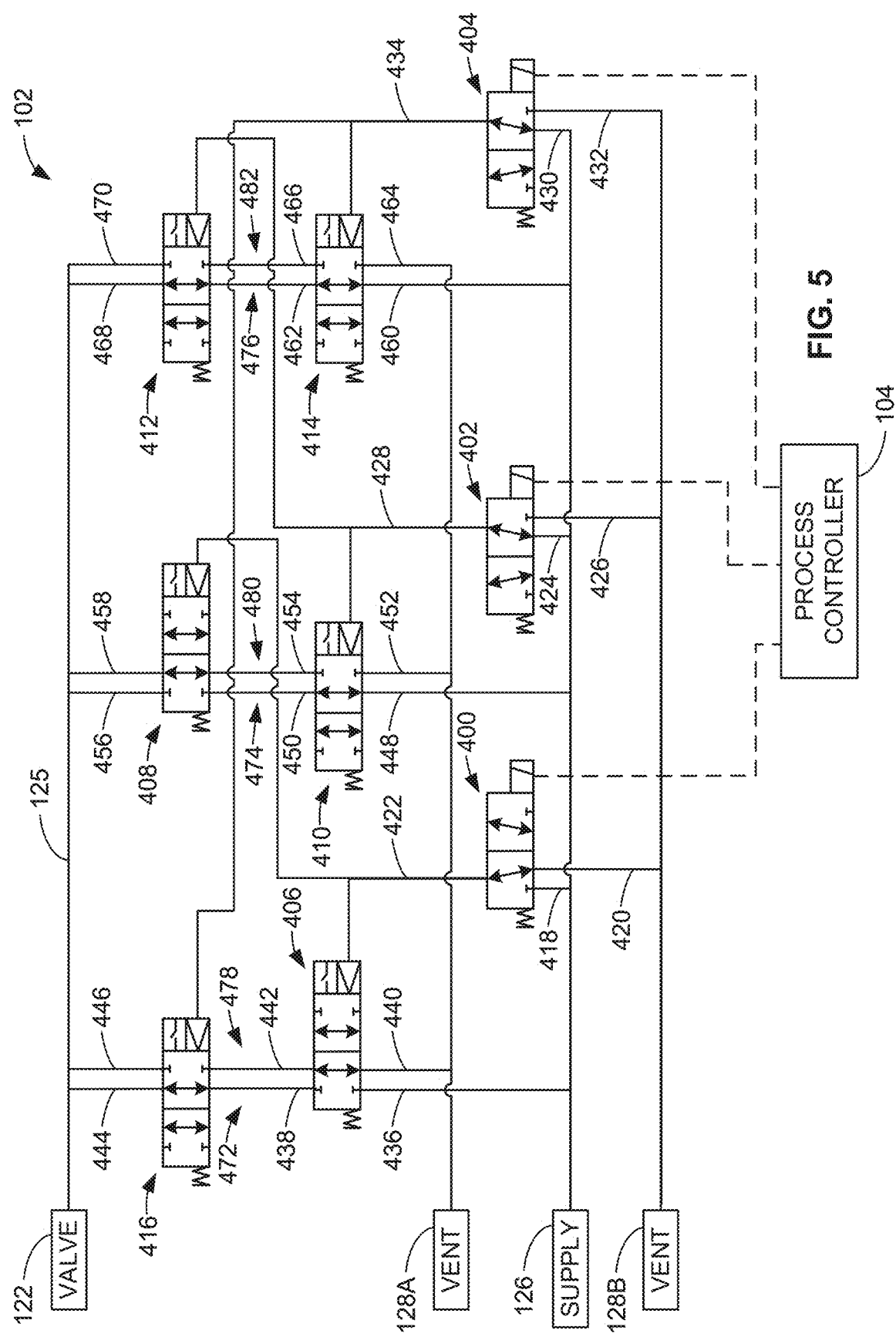
FIG. 5 is a schematic of the example pneumatic control assembly of FIG. 1 in a state in which two example solenoid valves are energized and one example solenoid valve is de-energized.

FIG. 5 is a schematic of the example pneumatic control assembly 102 in a state in which two of the solenoid valves 400-404 are energized and one of the solenoid valves 400-404 is de-energized. For example, in contrast to the example of FIG. 4, the first solenoid valve 400 has been de-energized and switched to its first position 208 (FIG. 2). This may occur, for example, if the first solenoid valve 400 failed to the first position 208. This may also occur during a testing operation. For example, the process controller 104 may de-energize the first solenoid valve 400 (e.g., by cutting off power to the solenoid coil 212 (FIG. 2)) to verify whether the first solenoid valve 400 and/or the first and second logic valves 406, 408 are operating correctly. In some examples, the process controller 104 verifies whether the first solenoid valve 400 and/or the first and second logic valves 406, 408 moved to their expected positions or states based on measurements from one or more sensors, such as proximity probes or infrared sensors, on or near the corresponding valves. All of the components numbered in FIG. 4 have been likewise numbered in FIG. 5.

The first solenoid valve 400 may be de-energized by the process controller 104. When the first solenoid valve 400 is de-energized, the spring 214 (FIG. 2) biases the first solenoid valve 400 to the first position 208 (FIG. 2). As shown in FIG. 5, when the first solenoid valve 400 is in its first position 208, the first solenoid valve 400 fluidly couples the first vent channel 420 and the first pilot channel 422. Thus, compressed air present in the first pilot channel 422 (e.g., present in the first pilot channel 422 while the first solenoid valve 400 was in the second position 210) is vented to the second vent 128B. As a result, the first logic valve 406 is moved to its first position 310 (FIG. 3) and the second logic valve 408 is moved to its first position 310 (FIG. 3).

When the first logic valve 406 is in its first position 310 (FIG. 3), the first logic valve 406 fluidly couples the fourth and fifth vent channels 440, 442, while blocking or preventing fluid flow between the fourth and fifth supply channels 436, 438. As such, the first parallel supply channel 472 is closed and compressed air no longer flows from the compressed air supply 126 to the trip valve header 125 via the first parallel supply channel 472. The first parallel vent channel 478 is still closed because the sixth logic valve 416 is in its second position 312 (FIG. 3). Thus, the compressed air in the trip valve header 125 is not vented to the first vent 128A via the first parallel vent channel 478.

Likewise, when the second logic valve 408 is in its first position 310 (FIG. 3), the second logic valve 408 fluidly couples eighth and ninth vent channels 454, 458, while blocking or preventing fluid flow between the eighth and ninth supply channels 450, 456. As such, the second parallel supply channel 474 is closed and compressed air no longer flows from the compressed air supply 126 to the trip valve header 125 via the second parallel supply channel 474. The second parallel vent channel 480 is still closed because the third logic valve 410 is in its second position 312 (FIG. 3). Thus, the compressed air in the trip valve header 125 is not vented to the first vent 128A via the second parallel vent channel 480.

In the illustrated example of FIG. 5, the second and third solenoid valves 402, 404 are still energized and in their second positions 210 (FIG. 2). As such, the fourth and fifth logic valves 412, 414 are still activated. Therefore, the third parallel supply channel 476 is still open and permits compressed air to flow from the compressed air supply 126 to the trip valve header 125. As a result, compressed air is still supplied to the trip valve header 125 and the trip valve 122 remains in the open position. Therefore, even in the event of the de-actuation of any one of the solenoid valves 400, 402, 404 and/or one or both of its corresponding logic valves, the trip valve 122 remains in the open position. Accordingly, energizing at least two of the first, second, or third solenoid valves 400, 402, 404 (e.g., the second and third solenoid valves 402, 404 in the example of FIG. 5) fluidly couples the compressed air supply 126 to the trip valve header 125 and fluidly isolates the vents 128A, 128B from the trip valve header 125.

FIG. 6 is a schematic of the example pneumatic control assembly 102 in a state in which one of the solenoid valves 400-404 is energized or in its second position while the other two of the solenoid valves 400-404 are de-energized. For example, in contrast to FIG. 5, the second solenoid valve 402 has been de-energized and switched to its first position 208 (FIG. 2). As such, the first and second solenoid valves 400, 402 are in their first position 208 (FIG. 2). However, the third solenoid valve 404 remains energized or in its second position 210. This may occur, for example, if the process controller 104 de-energizes the first, second, and third solenoid valves 400, 402, 404, but the third solenoid valve 404 has failed in its second position. As explained below, even if one of the solenoid valves (and/or its associated logic valves) fails, the other solenoid valves 400-404 can be operated to vent the compressed air from the trip valve header 125 to enable the trip valve 122 to close. All of the components numbered in FIG. 4 have been likewise numbered in FIG. 6.

When the second solenoid valve 402 is de-energized, the spring 214 biases the second solenoid valve 402 to the first position 208 (FIG. 2). As shown in FIG. 6, when the second solenoid valve 402 is in its first position 208, the second solenoid valve 402 fluidly couples the second vent channel 426 and second pilot channel 428. Compressed air present in the second pilot channel 428 (e.g., present in the second pilot channel 428 while the second solenoid valve 402 was in the second position 210) is vented to the second vent 128B. As a result, the third logic valve 410 is moved to its first position 310 (FIG. 3) and the fourth logic valve 412 is moved to its first position 310 (FIG. 3).

When the third logic valve 410 is in its first position 310 (FIG. 3), the third logic valve 410 fluidly couples the seventh and eighth vent channels 452, 454, while blocking or preventing fluid flow between the seventh and eighth supply channels 448, 450. As such, the second parallel vent channel 480 is open and the compressed air in the trip valve header 125 is vented to the first vent 128A, which enables the trip valve 122 to close. The second parallel supply channel 472 is still closed.

When the fourth logic valve 412 is in its first position 310 (FIG. 3), the fourth logic valve 412 fluidly couples the eleventh and twelfth vent channels 466, 470, while blocking or preventing fluid flow between the eleventh and twelfth supply channels 462, 468. As such, compressed air no longer flows from the compressed air supply 126 to the trip valve header 125 via the third parallel supply channel 476. The third parallel vent channel 482 is still closed because the fifth logic valve 414 is in its second position 312 (FIG. 3). Therefore, even if one of the solenoid valves and/or one or both of its associated logic valves fails in an energized position, the other two solenoid valves can be de-energized to close the trip valve 122. Further, in such an instance, the first, second, and third parallel supply channels 472, 474, 476 are all closed, which avoids continuously dumping compressed air from the compressed air supply 126 to atmosphere. Accordingly, de-energizing at least two of the first, second, or third solenoid valves (e.g., the first and second solenoid valves 400, 402 in the example of FIG. 6) fluidly couples the vent 128A to the trip valve header 125 and fluidly isolates the compressed air supply 126 from the trip valve header 125.

FIG. 7 is a schematic of the example pneumatic control assembly 102 in a state in which all of the solenoid valves 400-404 have been de-energized and are in their first position 208 (FIG. 2). For example, in the example of FIG. 7, in contrast to the example of FIG. 6, the third solenoid valve 404 has been de-energized and switched to its first position 208. This may occur, for example, if the process controller 104 de-energizes the first, second, and third solenoid valves 400-404 and all of the solenoid valves 400-404 properly move to their first position 208. Thus, in the example of FIG. 7, the first, second and third solenoid valves 400, 402, 404 are in the first position 208. Accordingly, the first, second, third, fourth, fifth, and sixth logic valves 406-416 are in their first position 310 (FIG. 3). The process controller 104 may, for example, de-energize the first, second, and third solenoid valves 400-404 simultaneously to close the trip valve 122. The process controller 104 may de-energize all of the solenoid valves 400-404 in response to detection of a trip condition and/or in response to a manual instruction, for example. In some examples, the process controller 104 can de-energize all of the solenoid valves 400-404 to test the trip valve 122. For example, after all of the solenoid valves 400-404 are de-energized, the process control 104 can determine (e.g., based on feedback from a sensor associated with the trip valve 122) whether the trip valve 122 properly closed. All of the components numbered in FIG. 4 have been likewise numbered in FIG. 7.

As shown in FIG. 7, the third solenoid valve 404 is in its first position 208 (FIG. 2). As such, the third solenoid valve 404 fluidly couples the third vent channel 432 and the third pilot channel 434. Compressed air present in the third pilot channel 434 (e.g., present in the third pilot channel 434 while the third solenoid valve 404 was in the second position 210) is vented to the second vent 128B. As a result, the fifth logic valve 414 is moved to its first position 310 (FIG. 3) and the sixth logic valve 416 is moved to its first position 310 (FIG. 3).

When the fifth logic valve 414 is in its first position 310 (FIG. 3), the fifth logic valve 414 fluidly couples the tenth and eleventh vent channels 464, 466, while blocking or preventing fluid flow between tenth and eleventh supply channels 460, 462. As such, the third parallel vent channel 482 is open and the compressed air in the trip valve header 125 is vented to the first vent 128A via the third parallel vent channel 482, which enables the trip valve 122 to close. Further, when the sixth logic valve 416 is in its first position 310 (FIG. 3), the sixth logic valve 416 fluidly couples the fifth and sixth vent channels 442, 446, while blocking or preventing fluid flow between the fifth and sixth supply channels 438, 444. As such, the first parallel vent channel 478 is open and the compressed air in the trip valve header 125 is vented to the first vent 128A via the first parallel vent channel 478, which enables the trip valve 122 to close. Therefore, in this example, the first, second, and third parallel vent channels 478, 480, 482 are open and vent the trip valve header 125 to the first vent 128A.

To re-open the trip valve 122, the process controller 104 can re-energize the solenoid valves 400-404. Even if one of the solenoid valves 400-404 fails (such as in FIG. 5), the other two solenoid valves open one of the parallel supply channels 472-476 to pressurize the trip valve header 125 and open the trip valve 122.

The pneumatic control assembly 102 of FIGS. 4-7 exhibits redundancy in both the solenoid valves 400, 402, 404 and the logic valves 406, 408, 410, 412, 414, 416. Therefore, if one of the solenoid valves (and/or its associated logic valves) were to fail in either position, the pneumatic control assembly 102 can still be operated (as in FIG. 5 or 6) to supply compressed air to the trip valve header 125 or vent compressed air from the trip valve header 125. This reduces or eliminates down-time associated with fixing defective valves. Further, the example pneumatic control assembly 102 is advantageous because the valves are arranged such that none of the parallel supply channels 472-476 is open at the same time as any of the parallel vent channels 478-482. This avoids continuously dumping pressurized air from the compressed air supply 126 to atmosphere as seen in some known systems.

All of the example components of the pneumatic control assembly 102 can be integrated into a relatively small package, which reduces system tubing and connection ports seen in known systems. While in the illustrated examples of FIGS. 4-7 the solenoid valves 400-404 are implemented as three-port valves and the logic valves 406-416 are implemented as four-port valves, in other examples, any of the valves can be implemented as any other type of valve having more or fewer ports. In some examples, one or more of the valves may include additional ports, such as a drain port, to pressure balance the respective flow control member. Further, while in this example the logic valves are implemented as pneumatically actuated valves, in other examples, the logic valves may be implemented as another type of valve, such as a solenoid valve. In such an example, instead of controlling compressed air to the pilots of the logic valves, the solenoid valves 400-404 may control current to the logic valves.

Figure 8:
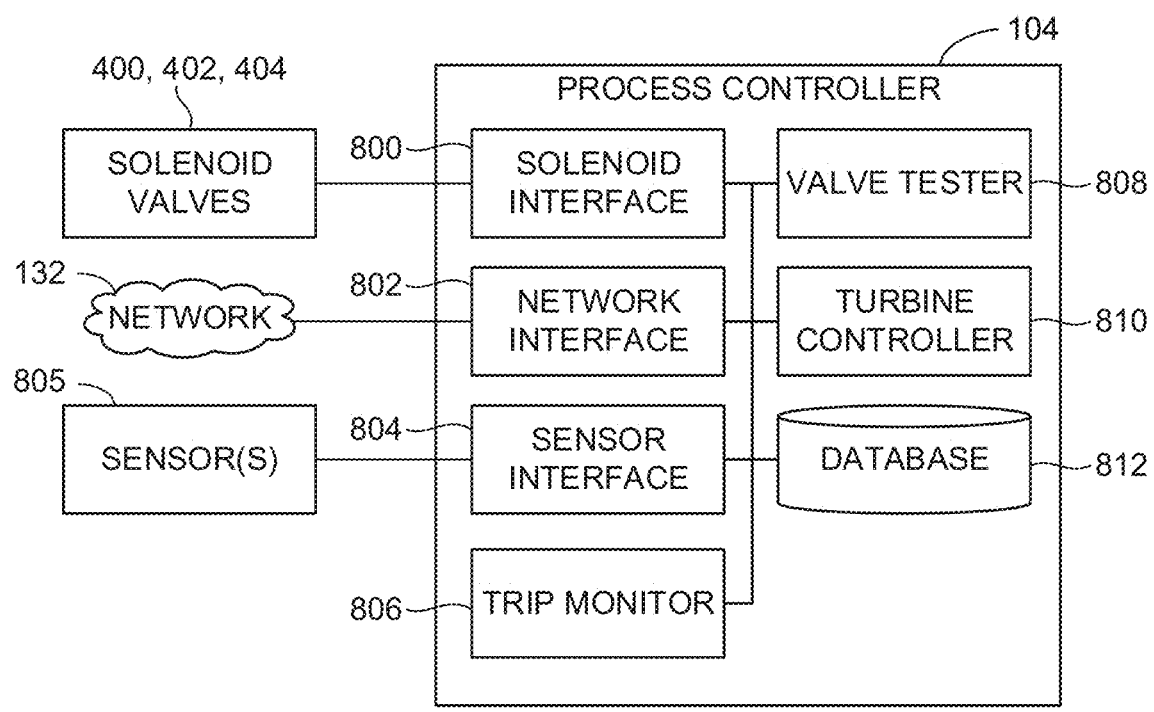
FIG. 8 is a block diagram of the example process controller of FIG. 1 used to monitor and control the example combustion turbine and the example pneumatic control assembly of FIGS. 1, 4, 5, 6 and/or 7.

FIG. 8 is a block diagram of the example process controller 104. As disclosed above, the process controller 104 can be used to monitor and/or control the combustion turbine 101 and/or the associated process control components including the example pneumatic control assembly 102 of FIGS. 1, 4, 5, 6 and/or 7. In FIG. 8, the process controller 104 includes an example solenoid interface 800, an example network interface 802, an example sensor interface 804, an example trip monitor 806, an example valve tester 808, an example turbine controller 810, and an example database 812.

The solenoid interface 800 operates to control the solenoid valves 400, 402, 404 by selectively energizing (activating) or de-energizing (de-activating) the example solenoid valves 400, 402, 404. For example, the solenoid interface 800 can apply an electrical current to the solenoid coils 212 (FIG. 3) of the solenoid valves 400-404 to actuate, energize, and/or otherwise direct the solenoid valves 400-404 to move against the bias of their springs 214 (FIG. 2) from their first position 208 to their second position 210. Conversely, the solenoid interface 800 can cease or reduce the application of the electrical current to the solenoid coils 212, which enables the springs 214 to bias the solenoid valves 400-404 from their second position 210 to their first position 208. The solenoid interface 800 can operate each of the solenoid valves 400-404 independently or simultaneously. The solenoid interface 800 may energize or de-energize any combination of the solenoid valves 400-404 based on one or more commands from other blocks of the process controller 104 and/or the network 132 (FIG. 1).

The network interface 802 obtains information from and/or transmits information to an example network, such as the network 132 (FIG. 1). For example, the network interface 802 may receive commands (e.g., a trip valve actuation command, an online testing command, etc.) from the network 132. Additionally or alternatively, the network interface 802 may transmit information (e.g., a status condition of a solenoid valve and/or a logic valve, sensor information associated with the combustion turbine 101, etc.) to the network.

The sensor interface 804 receives output signals (sensor data) from one or more sensor(s) 805 associated with the combustion turbine 101, the pneumatic control assembly 102, and/or any other components associated with the control of the system 100 of FIG. 1. For example, one or more of the sensor(s) 805 may include pressure sensor(s) used to take pressure measurements at one or more locations of the pneumatic control assembly 102, such as the supply channels 418, 424, 430, 436, 438, 444, 448, 450, 456, 460, 462, 468, the vent channels 420, 426, 432, 440, 442, 446, 452, 454, 458, 464, 466, 470, the pilot channels 422, 428, 434, the trip valve header 125, etc. Additionally or alternatively, one or more of the sensor(s) 805 may include one or more position sensors (e.g., proximity probes, infrared sensors, etc.) to measure the positions or states of the solenoid valves 400-404 and the logic valves 406-416, one or more sensors (e.g., an electromagnetic sensor) to measure the speed of the shaft 114, one or more sensors (e.g., an electric load sensor) to measure the electric load status, and/or one or more sensors to measure vibration from one or more components. In some examples, the sensor interface 804 includes components to condition (e.g., filter) and/or interpret the signals. The sensor interface 804 can store the sensor measurements in the database 812 and/or transmit the sensor measurements to one or more of the other blocks of the process controller 104 and/or the network 132.

The trip monitor 806 monitors for one or more trip conditions. If the trip monitor 806 detects one or more trip conditions, the trip monitor 806 instructs the solenoid interface 800 to operate (e.g., de-energize) one or more of the solenoid valves 400, 402, 404 to close the trip valve 122 and shut off fuel flow to the combustion turbine 101. In some examples, the trip monitor 806 monitors for the trip condition(s) by comparing the sensor measurements received by the sensor interface 804 to one or more thresholds. If a measurement satisfies (e.g., meets or exceeds) a threshold, the trip monitor 806 may determine a trip condition is present. For example, the trip monitor 806 may compare the speed of the shaft 114 to a threshold. If the speed exceeds the threshold, the trip monitor 806 instructs the solenoid interface 800 to de-energize the solenoid valves 400, 402, 404.

In the example of FIG. 8, the process controller 104 includes a valve tester 808. The valve tester 808 executes a testing procedure for testing the functionality of one or more of the solenoid valves 400-404, the logic valves 406-416, and/or the trip valve 122. For example, the valve tester 808 may instruct the solenoid interface 800 to energize and/or de-energize one or more of the solenoid valves 400-404 in a particular sequence and determine, based on measurements from the sensor(s) 805, whether the valve(s) is/are operating correctly. An example of such a procedure is disclosed in FIG. 10. If one or more of the valves are determined to be defective, the valve tester 808 may generate an alert. The alert may be an indicator, such as a light, a sound, etc. and/or may be a message. Such an alert message can be communicated to a technician and/or to the network 132.

In the example of FIG. 8, the process controller 104 includes the turbine controller 810. The turbine controller 810 may be operatively coupled to one or more of the combustion turbine 101, an auxiliary engine associated with the combustion turbine 101, and/or any other component associated with and/or contained in the combustion turbine 101. The turbine controller 810 may implement one or more startup or shutdown procedures in the combustion turbine 101.

In the example of FIG. 8, the process controller 104 includes the database 812. The database 812 may store information received from the network interface 802, sensor information collected from the sensor interface 804, information received from the trip monitor 806, information received from the valve tester 808, and/or information received from the turbine controller 810. The database 812 can be implemented by a volatile memory (e.g., a Synchronous Dynamic Random Access Memory (SDRAM), Dynamic Random Access Memory (DRAM), RAMBUS® Dynamic Random Access Memory (RDRAM®), etc.) and/or a non-volatile memory (e.g., flash memory). The database 812 may additionally or alternatively be implemented by one or more double data rate (DDR) memories, such as DDR, DDR2, DDR3, DDR4, mobile DDR (mDDR), etc. The database 812 may additionally or alternatively be implemented by one or more mass storage devices such as hard disk drive(s), compact disk drive(s), digital versatile disk drive(s), solid-state disk drive(s), etc.

While an example manner of implementing the process controller 104 of FIGS. 1 and 4-7 is illustrated in FIG. 8, one or more of the elements, processes and/or devices illustrated in FIG. 8 may be combined, divided, re-arranged, omitted, eliminated and/or implemented in any other way. Further, the example solenoid interface 800, the example network interface 802, the example sensor interface 804, the example trip monitor 806, the example valve tester 808, the example turbine controller 810, the example database 812, and/or, more generally, the example process controller 104 of FIG. 8 may be implemented by hardware, software, firmware and/or any combination of hardware, software and/or firmware. Thus, for example, any of the example solenoid interface 800, the example network interface 802, the example sensor interface 804, the example trip monitor 806, the example valve tester 808, the example turbine controller 810, the example database 812, and/or, more generally, the example process controller 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example solenoid interface 800, the example network interface 802, the example sensor interface 804, the example trip monitor 806, the example valve tester 808, the example turbine controller 810, and/or the example database 812 is/are hereby expressly defined to include a non-transitory computer readable storage device or storage disk such as a memory, a digital versatile disk (DVD), a compact disk (CD), a Blu-ray disk, etc. including the software and/or firmware. Further still, the example process controller 104 of FIG. 8 may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
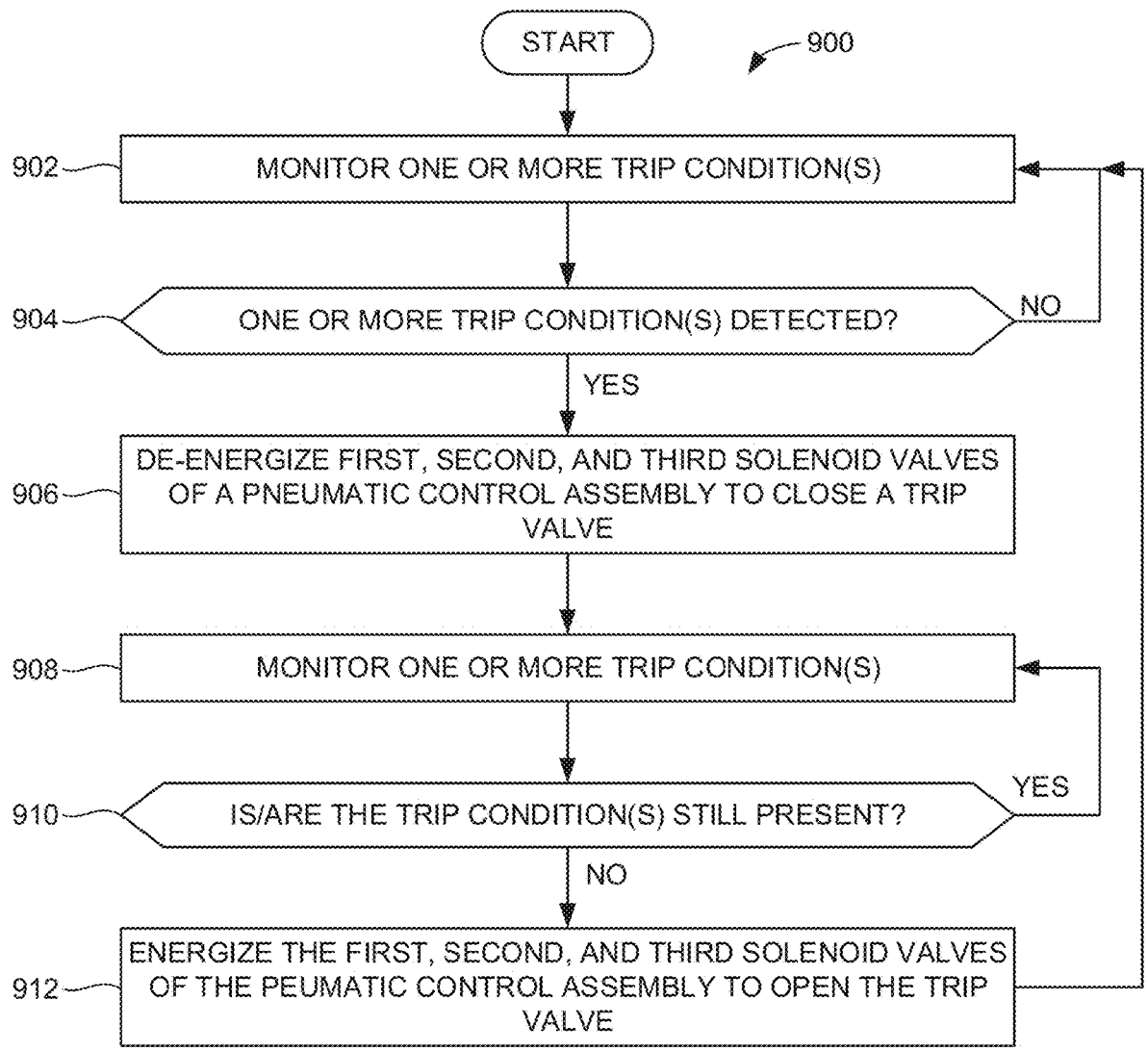
FIG. 9 is a flowchart representative of example machine readable instructions that may be executed to implement the example process controller of FIGS. 1, 4, 5, 6, 7 and/or 8 to control the example pneumatic control assembly to trip the example combustion turbine of FIG. 1.
Figure 10:
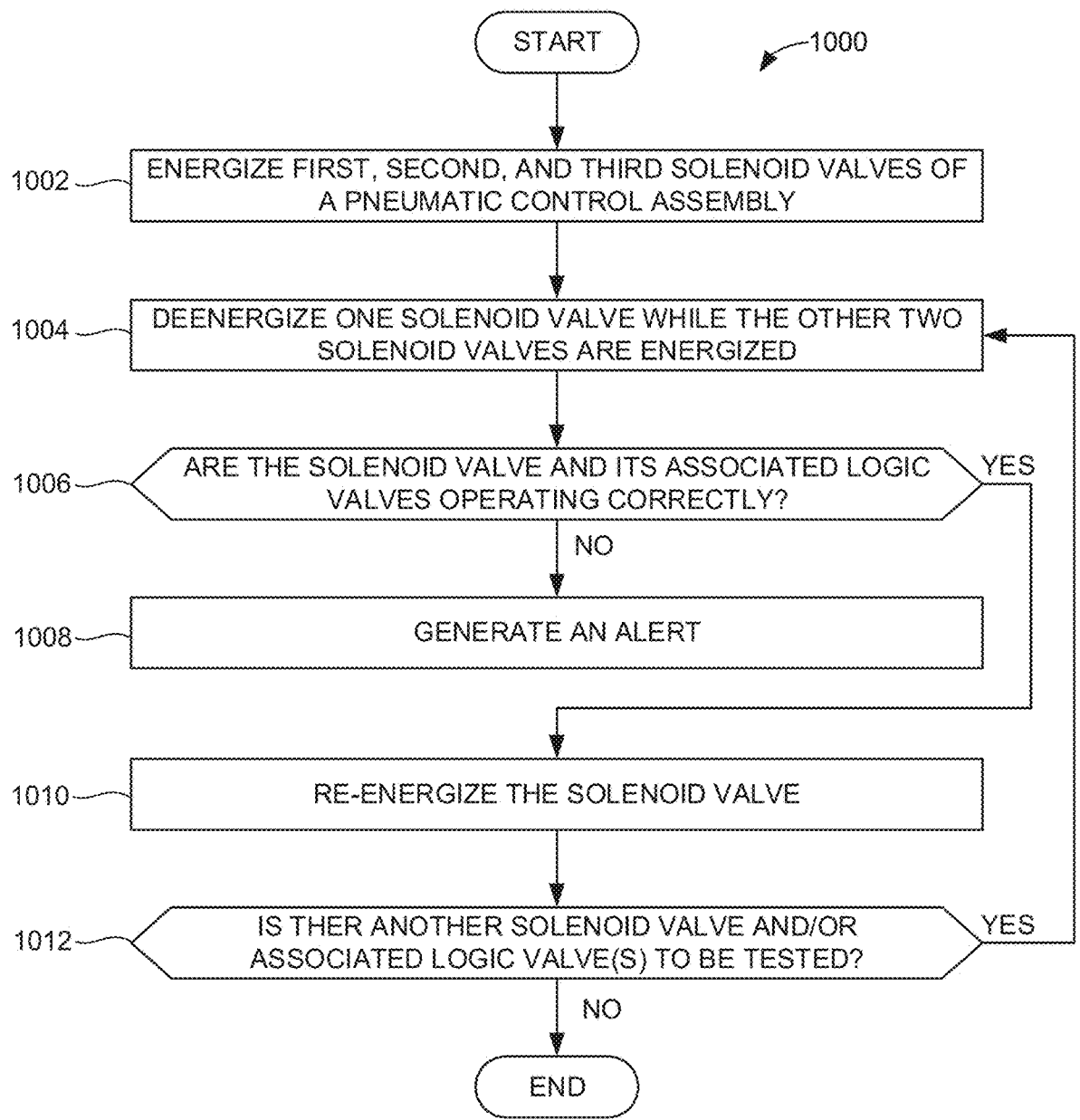
FIG. 10 is a flowchart representative of example machine readable instructions that may be executed to implement the example process controller of FIGS. 1, 4, 5, 6, 7 and/or 8 to test an example solenoid and its associated logic valves of the example pneumatic control assembly of FIGS. 1, 4, 5, 6 and/or 7.

Flowcharts representative of example hardware logic, machine readable instructions, hardware implemented state machines, and/or any combination thereof for implementing the process controller 104 of FIG. 8 are shown in FIGS. 9 and 10. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 9 and 10, many other methods of implementing the example process controller 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9 and 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart 900 representative of example machine executable instructions that may be implemented by the example process controller 104 of FIG. 8 to control the pneumatic control assembly 102 to trip a combustion turbine, such as the combustion turbine 101 of FIG. 1. The example process of FIG. 9 assumes that the first, second, and third solenoid valves 400-404 are energized (in their second positions 210) and the trip valve 122 is open. At block 902, the trip monitor 806 monitors for the occurrence of one or more trip conditions. For example, the sensor interface 804 may receive output signals or measurements from the one or more sensors 805. The trip monitor 806 may compare the measurements to one or more thresholds. Examples of trip conditions may include loss of load, overspeed, excess heat and/or thermal stresses, and/or excess vibrations.

At block 904, the trip monitor 806 determines whether one or more trip conditions have been detected. For example, the trip monitor 806 may compare the sensor measurements to one or more thresholds. In some examples, if the measurements do not satisfy the thresholds, a trip condition is not present, but if one or more of the measurements satisfy their thresholds, a trip condition is present. If the trip monitor 806 determines there are no trip condition(s), control proceeds to block 902 and the trip monitor 806 continues to monitor for one or more trip conditions.

If one or more trip conditions is/are detected by the trip monitor 806, the solenoid interface 800, at block 906, de-energizes the first, second, and third solenoid valves 400-404 of the pneumatic control assembly 102. An example state of the pneumatic control assembly 102 with the first, second, and third solenoid valves 400, 402, 404 de-energized is shown in FIG. 7. When the first, second, and third solenoid valves 400-404 are de-energized, each of the first, second, third, fourth, fifth, and sixth logic valves 406-416 are moved to their first position 310 (FIG. 3). Therefore, the first, second, and third parallel vent channels 478-482 are opened, which vents the compressed air from the trip valve header 125 to the first vent 128A. As a result, the trip valve 122 closes (e.g., in response to a biasing element, such as a spring), thereby blocking or preventing fuel flow through the fuel line 123 (FIG. 1) to the combustor 108 (FIG. 1). As such, fuel is shut off from the combustion turbine 101 so that the combustion turbine 101 ceases operation.

At block 908, the trip monitor 806 monitors if the trip condition(s) are still present. For example, similar to block 902, the sensor interface 804 may receive output signals or measurements from the one or more sensor(s) 805, and the trip monitor 806 may compare the measurements to one or more thresholds.

At block 910, the trip monitor 806 determines if the trip conditions(s) is/are still present. For example, similar to block 904, the trip monitor 806 may compare the sensor measurements to one or more thresholds. If the trip condition(s) are still present, control proceeds to block 908 and the trip monitor 806 continues to monitor for the trip condition(s). If the trip condition(s) is/are no longer present, the solenoid interface 800, at block 912, energizes the first, second, and third solenoid valves 400-404 of the pneumatic control assembly 102. An example state of the pneumatic control assembly 102 with the first, second, and third solenoid valves 400, 402, 404 energized is shown in FIG. 4. When the first, second, and third solenoid valves 400-404 are energized, each of the first, second, third, fourth, fifth, and sixth logic valves 406-416 are moved to their second position 312 (FIG. 3). Thus, the first, second, and third parallel supply channels 472-476 are opened, which enables compressed air to flow from the supply 126 to the trip valve header 125. As a result, the trip valve 122 is opened, which enables fuel flow to the combustor 108 (FIG. 1). After block 912, control may proceed back to block 902 where the trip monitor 806 monitors for one or more trip condition(s). In other examples, the process of the example flowchart 900 may end.

FIG. 10 is a flowchart 1000 representative of example machine executable instructions that may be implemented by the example process controller 104 of FIG. 8 to test a solenoid valve and/or its associated logic valves of the pneumatic control assembly 102. The example process may be instructed or executed by the valve tester 808. At block 1002, solenoid interface 800 energizes the first, second, and third solenoid valves 400-404 of the pneumatic control assembly 102. This may occur during normal operation when the combustion turbine 100 is operational. An example of this state is shown in FIG. 4.

At block 1004, the valve tester 808 instructs the solenoid interface 800 to de-energize one of the solenoid valves while the other two solenoid valves are energized. For example, the solenoid interface 800 may de-energize the first solenoid valve 400 while the second and third solenoid valves 402, 404 are energized. An example of this state is shown in FIG. 5. While the second and third solenoid valves 402, 404 are energized, a supply channel (e.g., the third parallel supply channel 476) is formed between the compressed air supply 126 and the trip valve header 125. Even when the first solenoid valve 400 is de-energized, a supply channel remains open, which continues to pressurize the trip valve header 125 to hold the trip valve 122 in the open position. Thus, the combustion turbine 101 may continue to operate.

At block 1006, the valve tester 808 determines whether the first solenoid valve 400 and its associated first and second logic valves 406, 408 are operating correctly. If the first solenoid valve 400 and its associated logic valves 406, 408 are operating correctly, after the first solenoid valve 400 is de-energized, the first solenoid valve 400 moves to its first position 208 (FIG. 2) and the first and second logic valves 406, 408 move to their first position 310 (FIG. 3). Therefore, to determine whether the first solenoid 400 is operating correctly, the process controller 104 determines, after the first solenoid 400 is de-energized, whether the first solenoid valve 400 moved from a first position (e.g., the second position 210 of FIG. 2) to a second position (e.g., the first position 208 of FIG. 2). Further, to determine whether the first and second logic valves 406, 408 are operating correctly, the process controller 104 determines, after the first solenoid 400 is de-energized, whether first and second logic valves 406, 408 moved from a first position (e.g., the second position 312 of FIG. 3) to a second position (e.g., the first position 310 of FIG. 3).

In some examples, the valve tester 808 determines whether the first solenoid valve 400 and the first and second logic valves 406, 408 correctly moved to their first positions based on measurements from the one or more sensor(s) 805 provided to the sensor interface 804. In some examples, the sensor(s) 805 include positions sensors that physically measure the position of the respective valves 400, 406, 408. Additionally or alternatively, the sensor(s) 805 may include pressure sensors that measure the pressure in certain ones of the supply and/or vent channels. Depending on when the valves 400, 406, 408 are moved, the pressure in certain channels should change. Thus, the example sensor(s) 805 provide feedback to the process controller 104 about the state of the valves. The valve tester 808 may compare the sensor measurements to one or more thresholds to determine whether the first solenoid valve 400 and the first and second logic valves 406, 408 correctly moved to their first positions. In some examples, the solenoid interface 800 may energize and de-energize the first solenoid valve 400 in a sequence while monitoring the sensor data to determine if the first solenoid valve 400 and the first and second logic valves 406, 408 are operating correctly.

If the valve tester 808 determines that the first solenoid valve 400, the first logic valve 406, and/or the second logic valve 408 is/are not operating correctly (e.g., did not move from the second position to the first position or vice versa), the valve tester 808, at block 1008, generates an alert. In such an instance, a technician can replace or fix the defective valve.

If the valve tester 808, determines that the solenoid valve 400 and the first and second logic valves 406, 408 are operating correctly, the solenoid interface 800, at block 1010, energizes the first solenoid valve 400. For example, the valve tester 808 may re-energize the first solenoid valve 400 in response to determining the first solenoid valve 400 moved from a first position (e.g., the second position 210 of FIG. 2 or the first position 310 of FIG. 3) to a second position (e.g., the first position 208 of FIG. 2 or the first position 310 of FIG. 3). In such an instance, all three of the solenoid valves 400, 402, 404 are in their first positions. An example of this state is shown in FIG. 4.

At block 1010, the process controller 104 determines whether there is another valve to check. For example, after checking the first solenoid valve 400, the second solenoid valve 402 and the third solenoid valve 404 and their associated logic valves may be checked. In such an instance, control proceeds back to block 1002 and another one of the solenoid valves, such as the second solenoid valve 402, is de-energized and tested.

If all of the solenoid valves 400-404 and their associated logic valves 406-416 have been tested and are operating correctly, the example process of FIG. 10 may end. In some examples, the process of FIG. 10 may be repeated periodically to ensure the example solenoid valves and the examples logic valves are operating correctly. For example, the process controller 104 may perform the testing operation of FIG. 10 every five minutes, once an hour, once a day, twice a day, once a week, or any other time period.

Figure 11:
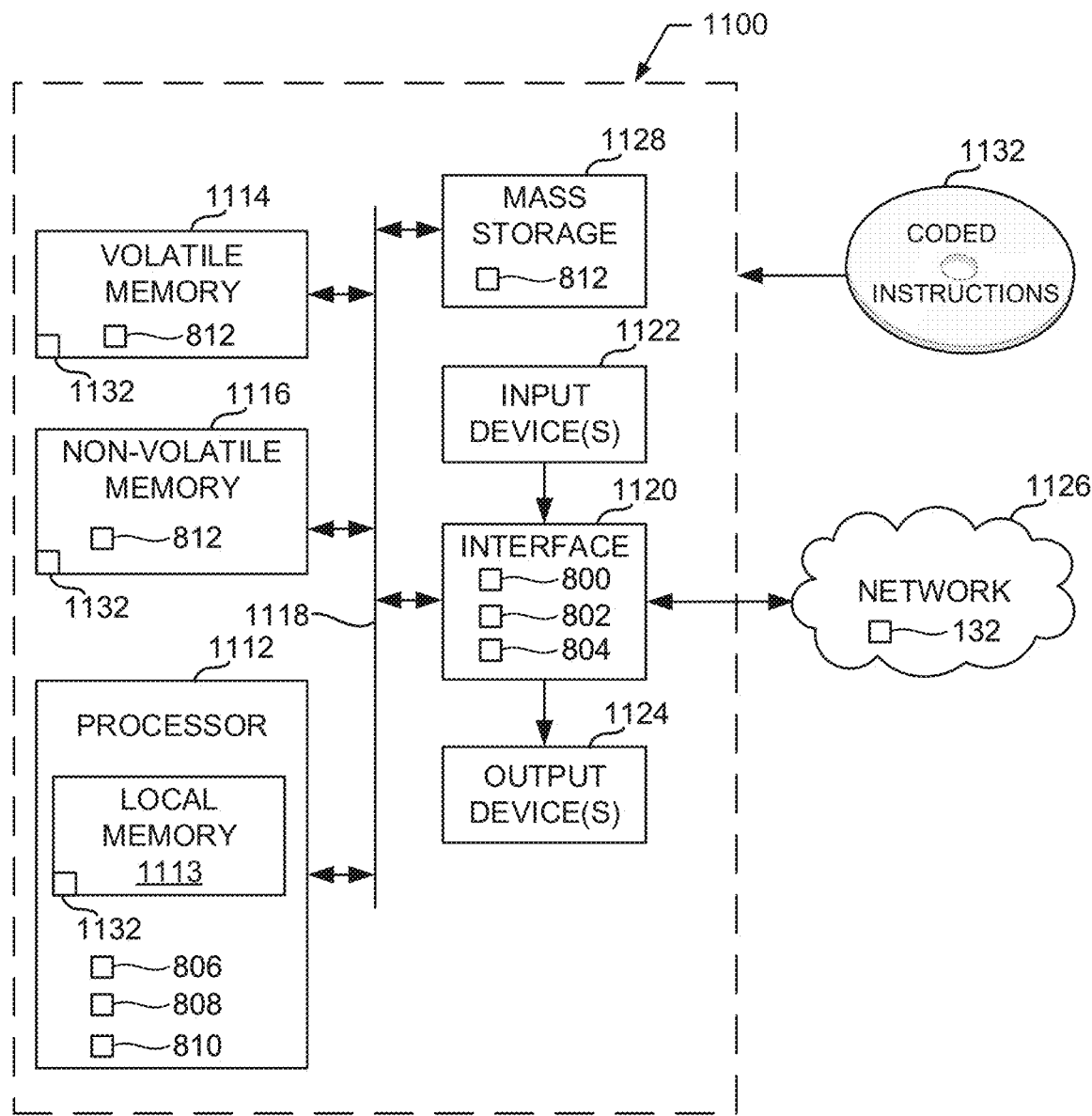
FIG. 11 is a block diagram of an example processing platform structured to execute the machine readable instructions of FIGS. 9 and/or 10 to implement the example process controller of FIGS. 1, 4, 5, 6, 7 and/or 8.

FIG. 11 is a block diagram of an example processor platform 1100 structured to execute the instructions of FIGS. 9 and 10 to implement the process controller of FIG. 8. The processor platform 1100 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1112 implements the example trip monitor 806, the example valve tester 808, and the example turbine controller 810 of the process controller 104 of FIG. 8.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface. In this example, the interface circuit 1120 implements the example solenoid interface 800, the example network interface 802, and the example sensor interface 804 of the process controller 104 of FIG. 8.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc. In this example, the network 1126 includes and/or implements the network 132 of FIG. 1.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In this example, the volatile memory 1114, the non-volatile memory 1116, and/or the mass storage devices 1128 can implement the database 812 of the process controller 104 of FIG. 8.

The machine executable instructions 1132 of FIGS. 9 and 11 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that improve pneumatic controls. The example methods, apparatus and articles of manufacture disclosed herein can implement triple redundant pneumatic control assemblies. Unlike known systems, the examples disclosed herein enable on-line testability and provide feedback to a process controller.

Example 1 includes a pneumatic control assembly comprising first, second, and third parallel supply channels between a compressed air supply and a valve header, first, second, and third parallel vent channels between a vent and the valve header, first, second, third, fourth, fifth, and sixth logic valves, the first and sixth logic valves disposed in the first parallel supply channel and the first parallel vent channel, the second and third logic valves disposed in the second parallel supply channel and the second parallel vent channel, and the fourth and fifth logic valves disposed in the third parallel supply channel and the third parallel vent channel, a first solenoid valve to control the first and second logic valves, a second solenoid valve to control the third and fourth logic valves, and a third solenoid valve to control the fifth and sixth logic valves.

Example 2 includes the pneumatic control assembly of example 1, wherein when the first and sixth logic valves are in an actuated position, the first parallel vent channel is open and the first parallel supply channel is closed, when the first and sixth logic valves are in a de-actuated position, the first parallel supply channel is open and the first parallel vent channel is closed, and when one of the first logic valve or the second logic valve is in the actuated position and the other of the first logic valve or the second logic valve is in the de-actuated position, the first parallel supply channel and the first parallel vent channel are closed.

Example 3 includes the pneumatic control assembly of example 2, wherein when the second and third logic valves are in an actuated position, the second parallel vent channel is open and the second parallel supply channel is closed, when the second and third logic valves are in a de-actuated position, the second parallel supply channel is open and the second parallel vent channel is closed, and when one of the second logic valve or the third logic valve is in the actuated position and the other of the second logic valve or the third logic valve is in the de-actuated position, the second parallel supply channel and the second parallel vent channel are closed.

Example 4 includes the pneumatic control assembly of example 3, wherein when the fourth and fifth logic valves are in an actuated position, the third parallel vent channel is open and the third parallel supply channel is closed, when the fourth and fifth logic valves are in a de-actuated position, the third parallel supply channel is open and the third parallel vent channel is closed, and when one of the fourth logic valve or the fifth logic valve is in the actuated position and the other of the fourth logic valve or the fifth logic valve is in the de-actuated position, the third parallel supply channel and the third parallel vent channel are closed.

Example 5 includes the pneumatic control assembly of example 1, wherein the first, second, third, fourth, fifth, and sixth logic valves include respective biasing elements and are piloted by compressed air against the bias of the respective biasing elements.

Example 6 includes the pneumatic control assembly of example 5, further including a first pilot channel fluidly coupled between the first solenoid valve and the first and second logic valves, a second pilot channel fluidly coupled between the second solenoid valve and the third and fourth logic valves, and a third pilot channel fluidly coupled between the third solenoid valve and the fifth and sixth logic valves.

Example 7 includes the pneumatic control assembly of example 6, wherein the first solenoid valve is operable between a first position that fluidly couples the first pilot channel and the vent and a second position that fluidly couples the first pilot channel and the compressed air supply, the second solenoid valve is operable between a first position that fluidly couples the second pilot channel and the vent and a second position that fluidly couples the second pilot channel and the compressed air supply, and the third solenoid valve is operable between a first position that fluidly couples the third pilot channel and the vent and a second position that fluidly couples the third pilot channel and the compressed air supply.

Example 8 includes the pneumatic control assembly of example 1, wherein energizing at least two of the first, second, or third solenoid valves fluidly couples the compressed air supply to the valve header and fluidly isolates the vent from the valve header.

Example 9 includes the pneumatic control assembly of example 1, wherein de-energizing at least two of the first, second, or third solenoid valves fluidly couples the vent to the valve header and fluidly isolates the compressed air supply from the valve header.

Example 10 includes the pneumatic control assembly of example 1, wherein the first, second, and third solenoid valves include respective biasing elements to bias the first, second, and third solenoid valves to a de-energized position.

Example 11 includes a system comprising a pneumatically actuated valve, a compressed air supply, a vent, and a pneumatic control assembly including first, second, and third parallel supply channels between the pneumatically actuated valve and the compressed air supply, first, second, and third parallel vent channels between the pneumatically actuated valve and the vent, and first, second, third, fourth, fifth, and sixth logic valves, the first and sixth logic valves disposed in the first parallel supply channel and the first parallel vent channel, the second and third logic valves disposed in the second parallel supply channel and the second parallel vent channel, the fourth and fifth logic valves disposed in the third parallel supply channel and the third parallel vent channel, the first, second, third, fourth, fifth, and sixth logic valves to control the flow of compressed air between the pneumatically actuated valve, the compressed air supply, and the vent.

Example 12 includes the system of example 11, wherein the first, second, third, fourth, fifth, and sixth logic valves are pneumatically piloted logic valves.

Example 13 includes the system of example 12, wherein the pneumatic control assembly further includes a first solenoid valve to control air flow from the compressed air supply to a first pilot channel fluidly coupled to the first and second logic valves, a second solenoid valve to control air flow from the compressed air supply to a second pilot channel fluidly coupled to the third and fourth logic valves, and a third solenoid valve to control air flow from the compressed air supply to a third pilot channel fluidly coupled to the fifth and sixth logic valves.

Example 14 includes the system of example 13, further including a process controller to energize or de-energize each of the first, second, and third solenoid valves.

Example 15 includes the system of example 11, further including a combustion turbine, and a fuel line to supply fuel to the combustion turbine, the pneumatically actuated valve disposed in the fuel line to control fuel flow to the combustion turbine.

Example 16 includes the system of example 15, further including a process controller to de-energize each of the first, second, and third solenoid valves in response to detecting a trip condition.

Example 17 includes a non-transitory computer readable storage medium comprising computer readable instructions that, when executed, cause at least one processor to at least energize first, second, and third solenoid valves of a pneumatic control assembly, de-energize the first solenoid valve while the second and third solenoid valves are energized, wherein, while the second and third solenoid valves are energized, a supply channel is formed between a compressed air supply and a valve header, and determine, after the first solenoid valve is de-energized, whether the first solenoid valve moved from a first position to a second position.

Example 18 includes the non-transitory computer readable storage medium of example 17, wherein the instructions, when executed, further cause the at least one processor to determine, after the first solenoid valve is de-energized, whether first and second logic valves associated with the first solenoid valve moved from a first position to a second position.

Example 19 includes the non-transitory computer readable storage medium of example 18, wherein the instructions, when executed, further cause the at least one processor to generate an alert in response to determining that one or more of the first solenoid valve, the first logic valve, or second logic valve did not move to the second position.

Example 20 includes the non-transitory computer readable storage medium of example 17, wherein the instructions, when executed, further cause the at least one processor to re-energize the first solenoid valve in response to determining the first solenoid valve moved from the first position to the second position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. A pneumatic control assembly comprising:
first, second, and third parallel supply channels between a compressed air supply and a valve header;
first, second, and third parallel vent channels between a vent and the valve header;
first, second, third, fourth, fifth, and sixth logic valves, the first and sixth logic valves each disposed in both the first parallel supply channel and the first parallel vent channel, the second and third logic valves each disposed in both the second parallel supply channel and the second parallel vent channel, and the fourth and fifth logic valves each disposed in both the third parallel supply channel and the third parallel vent channel;
a first solenoid valve to control the first and second logic valves;
a second solenoid valve to control the third and fourth logic valves; and
a third solenoid valve to control the fifth and sixth logic valves.

2. The pneumatic control assembly of claim 1, wherein:
when the first and sixth logic valves are in an actuated position, the first parallel vent channel is open and the first parallel supply channel is closed;
when the first and sixth logic valves are in a de-actuated position, the first parallel supply channel is open and the first parallel vent channel is closed; and
when the first logic valve or the second logic valve is in the actuated position and the other of the first logic valve or the second logic valve is in the de-actuated position, the first parallel supply channel and the first parallel vent channel are closed.

3. The pneumatic control assembly of claim 2, wherein:
when the second and third logic valves are in an actuated position, the second parallel vent channel is open and the second parallel supply channel is closed;
when the second and third logic valves are in a de-actuated position, the second parallel supply channel is open and the second parallel vent channel is closed; and
when the second logic valve or the third logic valve is in the actuated position and the other of the second logic valve or the third logic valve is in the de-actuated position, the second parallel supply channel and the second parallel vent channel are closed.

4. The pneumatic control assembly of claim 3, wherein:
when the fourth and fifth logic valves are in an actuated position, the third parallel vent channel is open and the third parallel supply channel is closed;
when the fourth and fifth logic valves are in a de-actuated position, the third parallel supply channel is open and the third parallel vent channel is closed; and
when the fourth logic valve or the fifth logic valve is in the actuated position and the other of the fourth logic valve or the fifth logic valve is in the de-actuated position, the third parallel supply channel and the third parallel vent channel are closed.

5. The pneumatic control assembly of claim 1, wherein the first, second, third, fourth, fifth, and sixth logic valves include respective biasing elements and are piloted by compressed air against a bias of the respective biasing elements.

6. The pneumatic control assembly of claim 5, further including:
a first pilot channel fluidly coupled between the first solenoid valve and the first and second logic valves;
a second pilot channel fluidly coupled between the second solenoid valve and the third and fourth logic valves; and
a third pilot channel fluidly coupled between the third solenoid valve and the fifth and sixth logic valves.

7. The pneumatic control assembly of claim 6, wherein:
the first solenoid valve is operable between a first position that fluidly couples the first pilot channel and the vent and a second position that fluidly couples the first pilot channel and the compressed air supply;
the second solenoid valve is operable between a first position that fluidly couples the second pilot channel and the vent and a second position that fluidly couples the second pilot channel and the compressed air supply; and
the third solenoid valve is operable between a first position that fluidly couples the third pilot channel and the vent and a second position that fluidly couples the third pilot channel and the compressed air supply.

8. The pneumatic control assembly of claim 1, wherein energizing at least two of the first, second, or third solenoid valves fluidly couples the compressed air supply to the valve header and fluidly isolates the vent from the valve header.

9. The pneumatic control assembly of claim 1, wherein de-energizing at least two of the first, second, or third solenoid valves fluidly couples the vent to the valve header and fluidly isolates the compressed air supply from the valve header.

10. The pneumatic control assembly of claim 1, wherein the first, second, and third solenoid valves include respective biasing elements to bias the first, second, and third solenoid valves to a de-energized position.

11. A system comprising:
a pneumatically actuated valve;
a compressed air supply;
a vent; and
a pneumatic control assembly including:
first, second, and third parallel supply channels between the pneumatically actuated valve and the compressed air supply;
first, second, and third parallel vent channels between the pneumatically actuated valve and the vent;
first, second, third, fourth, fifth, and sixth logic valves, the first and sixth logic valves each disposed in both the first parallel supply channel and the first parallel vent channel, the second and third logic valves each disposed in both the second parallel supply channel and the second parallel vent channel, the fourth and fifth logic valves each disposed in both the third parallel supply channel and the third parallel vent channel, the first, second, third, fourth, fifth, and sixth logic valves to control the flow of compressed air between the pneumatically actuated valve, the compressed air supply, and the vent;
a first solenoid valve to control air flow from the compressed air supply to a first pilot channel fluidly coupled to the first and second logic valves;
a second solenoid valve to control air flow from the compressed air supply to a second pilot channel fluidly coupled to the third and fourth logic valves; and
a third solenoid valve to control air flow from the compressed air supply to a third pilot channel fluidly coupled to the fifth and sixth logic valves.

12. The system of claim 11, wherein the first, second, third, fourth, fifth, and sixth logic valves are pneumatically piloted logic valves.

13. The system of claim 11, further including a process controller to energize or de-energize each of the first, second, and third solenoid valves.

14. The system of claim 11, further including:
a combustion turbine; and
a fuel line to supply fuel to the combustion turbine, the pneumatically actuated valve disposed in the fuel line to control fuel flow to the combustion turbine.

15. The system of claim 14, further including a process controller to de-energize each of the first, second, and third solenoid valves in response to detecting a trip condition.

16. A non-transitory computer readable storage medium comprising computer readable instructions that, when executed, cause at least one processor to at least:
energize first, second, and third solenoid valves of a pneumatic control assembly, the pneumatic control assembly including:
first, second, and third parallel supply channels between a compressed air supply and a valve header;
first, second, and third parallel vent channels between a vent and the valve header;

first, second, third, fourth, fifth, and sixth logic valves, the first and sixth logic valves each disposed in both the first parallel supply channel and the first parallel vent channel, the second and third logic valves each disposed in both the second parallel supply channel and the second parallel vent channel, and the fourth and fifth logic valves each disposed in both the third parallel supply channel and the third parallel vent channel, wherein the first solenoid valve is to control the first and second logic valves, the second solenoid valve is to control the third and fourth logic valves, and the third solenoid valve is to control the fifth and sixth logic valves;

de-energize the first solenoid valve while the second and third solenoid valves are energized, wherein, while the second and third solenoid valves are energized, the third parallel supply channel is open between the compressed air supply and the valve header; and determine, after the first solenoid valve is de-energized, whether the first solenoid valve moved from a first position to a second position.

17. The non-transitory computer readable storage medium of claim 16, wherein the instructions, when executed, further cause the at least one processor to determine, after the first solenoid valve is de-energized, whether the first and second logic valves associated with the first solenoid valve each moved from a first position to a second position.

18. The non-transitory computer readable storage medium of claim 17, wherein the instructions, when executed, further cause the at least one processor to generate an alert in response to determining that one or more of the first solenoid valve, the first logic valve, or second logic valve did not move to the second position.

19. The non-transitory computer readable storage medium of claim 16, wherein the instructions, when executed, further cause the at least one processor to re-energize the first solenoid valve in response to determining the first solenoid valve moved from the first position to the second position.

* * * * *